(12) United States Patent
Furuichi et al.

(10) Patent No.: US 10,681,154 B2
(45) Date of Patent: Jun. 9, 2020

(54) GATEWAY DEVICE ALLOWING MULTIPLE INFRASTRUCTURAL SERVICES TO ACCESS MULTIPLE IOT DEVICES

(71) Applicant: International Business Machines Corporation, Armonk, NY (US)

(72) Inventors: Sanehiro Furuichi, Setagaya-ku (JP); Takahito Tashiro, Albany, CA (US)

(73) Assignee: International Business Machines Corporation, Armonk, NY (US)

(*) Notice: Subject to any disclaimer, the term of this patent is extended or adjusted under 35 U.S.C. 154(b) by 141 days.

(21) Appl. No.: 15/921,696

(22) Filed: Mar. 15, 2018

(65) Prior Publication Data

US 2019/0289082 A1  Sep. 19, 2019

(51) Int. Cl.
*H04L 29/08* (2006.01)
*H04L 12/66* (2006.01)

(52) U.S. Cl.
CPC .............. *H04L 67/16* (2013.01); *H04L 12/66* (2013.01); *H04L 67/12* (2013.01); *H04L 67/10* (2013.01)

(58) Field of Classification Search
CPC ......... H04L 67/16; H04L 67/12; H04L 12/66; H04L 67/10
See application file for complete search history.

(56) References Cited

U.S. PATENT DOCUMENTS

| | | | |
|---|---|---|---|
| 9,111,221 B1 | 8/2015 | Kelly et al. | |
| 9,294,340 B1* | 3/2016 | Logue | G06F 16/258 |
| 9,674,880 B1 | 6/2017 | Egner et al. | |
| 2006/0271695 A1* | 11/2006 | Lavian | G06F 21/552 |
| | | | 709/229 |
| 2014/0244001 A1* | 8/2014 | Glickfield | H04L 67/16 |
| | | | 700/33 |
| 2015/0128215 A1* | 5/2015 | Son | H04L 67/1097 |
| | | | 726/2 |
| 2015/0156031 A1* | 6/2015 | Fadell | H04L 12/2816 |
| | | | 700/276 |

(Continued)

OTHER PUBLICATIONS

Furuichi et al. Original U.S. Appl. No. 15/276,845, filed Sep. 27, 2016.

(Continued)

*Primary Examiner* — Joe Chacko
(74) *Attorney, Agent, or Firm* — Edward P. Li

(57) ABSTRACT

A method, a computer program product, and a computer system for allowing multiple infrastructural services to access multiple IoT (Internet of Things) devices. A gateway device connects the multiple infrastructural services and the multiple IoT devices. The gateway device receives a use request from a first application of a first infrastructural service. Among the multiple IoT devices, the gateway device identifies an IoT device that meets one or more requirements in the use request. The gateway device determines whether the IoT device is being used by a second application of a second infrastructural service. The gateway device assigns to the first application an exclusive right to use the IoT device, in response to determining that the IoT device is not being used by the second application. The first application has a right to refer to data and a right to execute available commands without restriction.

15 Claims, 14 Drawing Sheets

(56) References Cited

U.S. PATENT DOCUMENTS

| | | | |
|---|---|---|---|
| 2015/0195365 A1* | 7/2015 | Choi ..................... | H04L 67/16 |
| | | | 715/739 |
| 2015/0319006 A1* | 11/2015 | Plummer ............ | H04L 12/2827 |
| | | | 700/83 |
| 2016/0381143 A1* | 12/2016 | Malik ................... | H04L 67/125 |
| | | | 455/518 |
| 2017/0013062 A1 | 1/2017 | Kim et al. | |
| 2017/0026488 A1 | 1/2017 | Hao et al. | |
| 2017/0171090 A1* | 6/2017 | Britt .................... | H04L 47/2425 |
| 2018/0063079 A1* | 3/2018 | Ding ........................ | H04L 9/16 |
| 2018/0314808 A1* | 11/2018 | Casey .................. | G06F 21/105 |
| 2019/0238358 A1* | 8/2019 | Hurewitz ............... | G06N 20/00 |

OTHER PUBLICATIONS

Mell et al. "The NIST Definition of Cloud Computing—Recommendations of the National Institute of Standards and Technology". Special Publication 800-145. Sep. 2011. Gaithersburg, MD. Seven pages.

"Harman IoT Gateway: A Step-Change in Delivering IoT" Feb. 16, 2017. Six pages. <https://services.harman.com/blogs/harman-iot-gateway-step-change-delivering-iot>.

"IBM Watson Internet of Things (IoT)" The Internet of Things becomes the Internet that thinks with Watson IoT. IBM Think 2018: Re-imagining the World through AI Innovation. Mar. 19-22. Las Vegas. <https://www.ibm.com/internet-of-things>.

* cited by examiner

GATEWAY DEVICE ALLOWING MULTIPLE INFRASTRUCTURAL SERVICES TO ACCESS MULTIPLE IOT DEVICES

BACKGROUND

The present invention relates generally to the Internet of Things (IoT), and more particularly to a gateway device allowing multiple infrastructural services to access multiple IoT devices.

Due to constraints such as physical size and battery capacity, many IoT devices employ indirect connection to a server via a nearby gateway apparatus rather than direct connection to the Internet. Multiple IoT devices are connected to the gateway apparatus. The gateway apparatus transmits/receives data and executes control commands on behalf of the IoT devices.

Generally, one gateway and a group of devices controlled by the gateway are managed by one cloud service, where collected data is used exclusively by that cloud service. To implement a second cloud service, another similar gateway and similar IoT devices need to be separately provided. This may cause duplicate installation of the same type of sensors or may cause failure to utilize effectively unused sensors.

SUMMARY

In one aspect, a method for allowing multiple infrastructural services to access multiple IoT (Internet of Things) devices is provided. The method includes receiving, by a gateway device, a use request from a first application of a first infrastructural service, wherein the gateway device connects the multiple infrastructural services and the multiple IoT devices. The method further includes identifying among the multiple IoT devices, by the gateway device, an IoT device that meets one or more requirements in the use request. The method further includes determining, by the gateway device, whether the IoT device is being used by a second application of a second infrastructural service. The method further includes assigning, by the gateway device, to the first application an exclusive right to use the IoT device, in response to determining that the IoT device is not being used by the second application. The first application is allowed to solely use the IoT device without being affected by the second application and the first application has a right to refer to data and a right to execute available commands without restriction.

In another aspect, a computer program product for allowing multiple infrastructural services to access multiple IoT (Internet of Things) devices is provided. The computer program product comprising one or more computer-readable tangible storage devices and program instructions stored on at least one of the one or more computer-readable tangible storage devices. The program instructions are executable to: receive, by a gateway device, a use request from a first application of a first infrastructural service, wherein the gateway device connects the multiple infrastructural services and the multiple IoT devices; identify among the multiple IoT devices, by the gateway device, an IoT device that meets one or more requirements in the use request; determine, by the gateway device, whether the IoT device is being used by a second application of a second infrastructural service; and assign, by the gateway device, to the first application an exclusive right to use the IoT device, in response to determining that the IoT device is not being used by the second application. The first application is allowed to solely use the IoT device without being affected by the second application and the first application has a right to refer to data and a right to execute available commands without restriction.

In yet another aspect, a computer system for allowing multiple infrastructural services to access multiple IoT (Internet of Things) devices is provided. The computer system comprises one or more processors, one or more computer readable tangible storage devices, and program instructions stored on at least one of the one or more computer readable tangible storage devices for execution by at least one of the one or more processors. The program instructions are executable to receive, by a gateway device, a use request from a first application of a first infrastructural service, wherein the gateway device connects the multiple infrastructural services and the multiple IoT devices. The program instructions are further executable to identify among the multiple IoT devices, by the gateway device, an IoT device that meets one or more requirements in the use request. The program instructions are further executable to determine, by the gateway device, whether the IoT device is being used by a second application of a second infrastructural service. The program instructions are further executable to assign, by the gateway device, to the first application an exclusive right to use the IoT device, in response to determining that the IoT device is not being used by the second application. The first application is allowed to solely use the IoT device without being affected by the second application and the first application has a right to refer to data and a right to execute available commands without restriction.

DETAILED DESCRIPTION

An object of the present invention is to allow multiple infrastructural services (or multiple cloud services) to have access to multiple IoT devices controlled by a gateway. In this document, an IoT platform in a cloud environment and applications built on the IoT platform are collectively referred to as a cloud service. By separating service providers from a gateway device provider, embodiments of the present invention increase efficiency in device management and reduce installation cost. For example, it will be possible that an automaker provides an on-board gateway, and the multiple cloud services such as an insurance service and a traffic control service purchase rights to access the multiple IoT devices. With the prevalence of IoT, various cloud services using sensor data and actuators are increasing. Embodiments of the present invention provide a mechanism allowing the multiple cloud services to share a group of IoT devices controlled by one gateway.

The foregoing description of various exemplary embodiments of the present invention is presented for purposes of illustration and description. It is neither intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Embodiments of the present invention will be described in detail with reference to the accompanying figures. It should be appreciated that figures provides only an illustration of one implementation and does not imply any limitations with regard to the environment in which different embodiments may be implemented.

Figure 1:
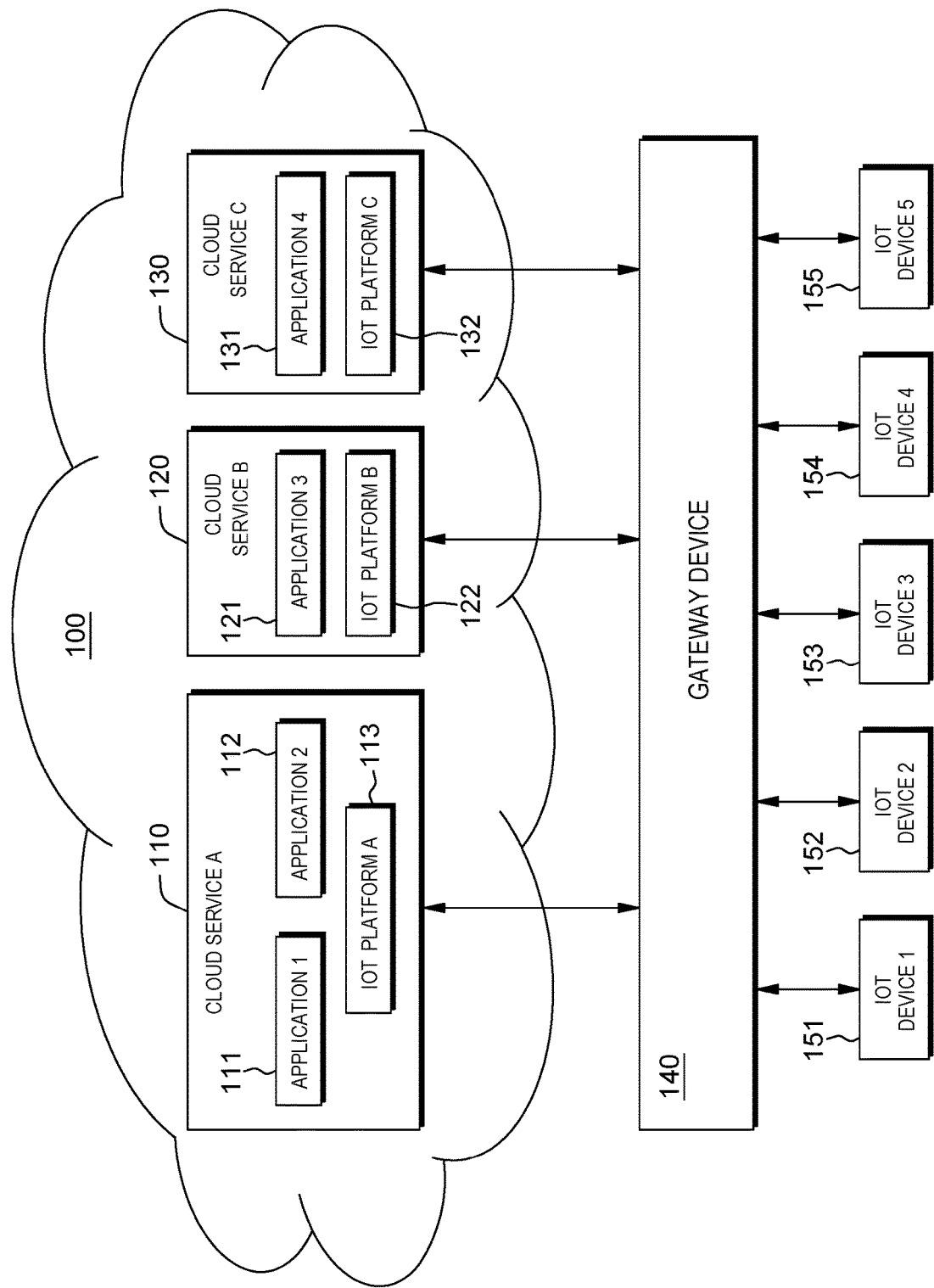
FIG. 1 is a systematic diagram illustrating multiple cloud services in a cloud environment, multiple IoT devices, and a gateway device allowing the multiple cloud services to access the multiple IoT devices, in accordance with one embodiment of the present invention.

FIG. 1 is a systematic diagram illustrating multiple cloud services (cloud service A 110, cloud service B 120, cloud service C 130) in cloud environment or infrastructure computing environment 100, multiple IoT devices 151 through 155, and gateway device 140 allowing cloud service A 110, cloud service B 120, cloud service C 130 to access multiple IoT devices 151 through 155, in accordance with one embodiment of the present invention. It should be appreciated that the numbers of the multiple cloud services and the IoT devices are only for the purpose of the illustration and do not imply any limitations with regard to the numbers of the multiple cloud services and the IoT devices.

As an example shown in FIG. 1, gateway device 140 connects multiple cloud services (namely cloud service A 110, cloud service B 120, and cloud service C 130) and multiple IoT devices (namely, IoT device 1 151, IoT device 2 152, IoT device 3 153, IoT device 4 154, and IoT device 5 155). Cloud service A 110 comprises application 1 111, application 2 112, and IoT platform A 113. Application 1 111 and application 2 112 are built on IoT platform A 113. Cloud service B 120 comprises application 3 121 and IoT platform B 122. Application 3 121 is built on IoT platform B 122. Cloud service C 130 comprises application 4 131 and IoT platform C 132. Application 4 131 is built on IoT platform C 132.

Figure 2:
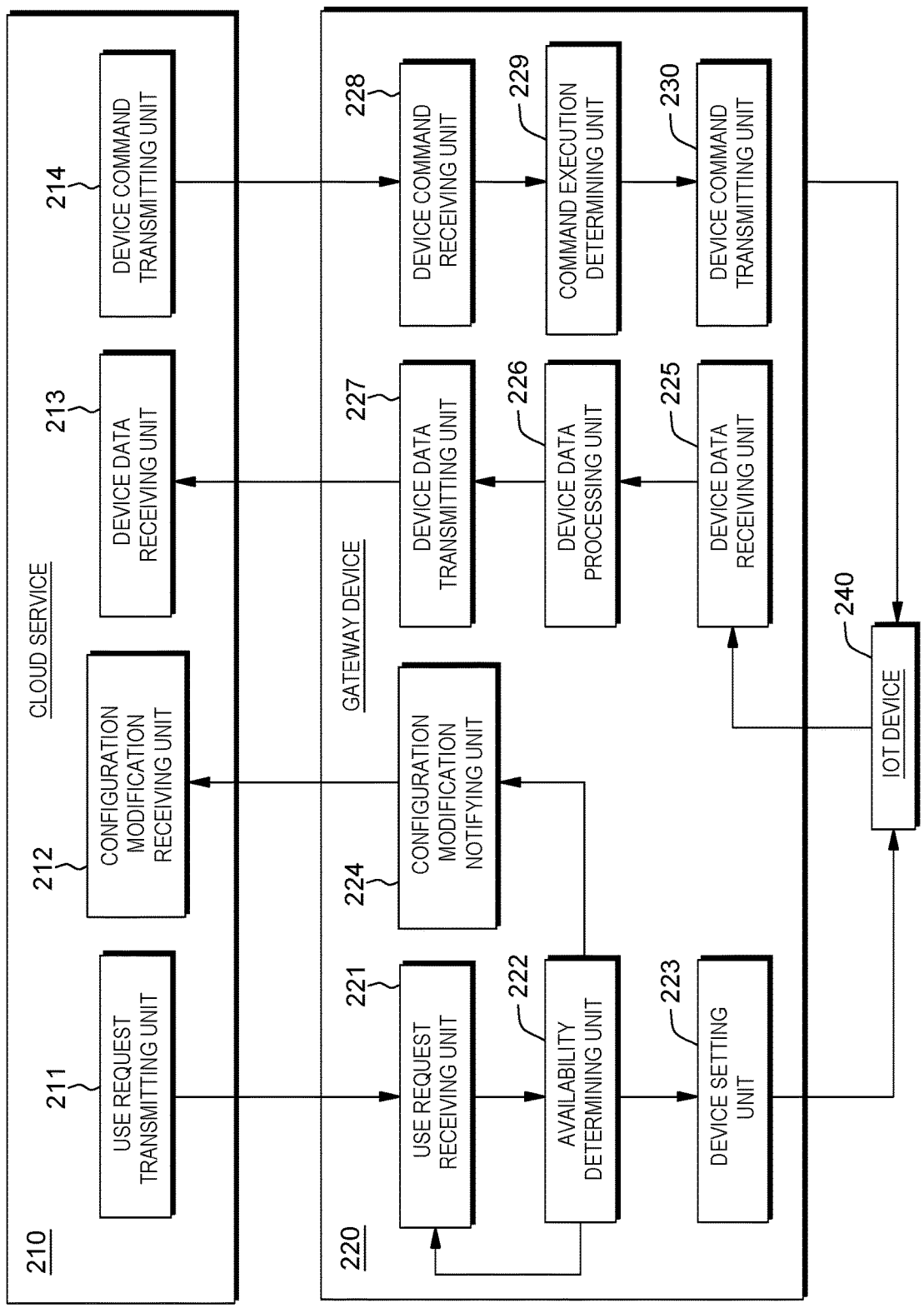
FIG. 2 is a diagram illustrating components of a cloud service, components of a gateway device, and a workflow of the gateway device allowing the cloud service to access an IoT device, in accordance with one embodiment of the present invention.

FIG. 2 is a diagram illustrating components of cloud service 210, components of gateway device 220, and a workflow of gateway device 220 allowing cloud service 210 to access IoT device 240, in accordance with one embodiment of the present invention. FIG. 2 illustrates cloud service 210 comprising components of cloud service A 110, cloud service B 120, or cloud service C 130 shown in FIG. 1. FIG. 2 illustrates gateway device 220 comprising components of gateway device 140 shown in FIG. 1. In FIG. 2, IoT device 240 is IoT device 1 151, IoT device 2 152, IoT device 3 153, IoT device 4 154, or IoT device 5 155.

Referring to FIG. 2, cloud service 210 comprises use request transmitting unit 211, configuration modification receiving unit 212, device data receiving unit 213, and device command transmitting unit 214. Gateway device 220 comprises use request receiving unit 211, availability determining unit 222, device setting unit 223, configuration modification notifying unit 224, device data receiving unit 225, device data processing unit 226, device data transmitting unit 227, device command receiving unit 228, command execution determining unit 229, and device command transmitting unit 230.

Referring to FIG. 2, use request transmitting unit 211 in cloud service 210 transmits a use request to use request receiving unit 211 in gateway device 220. The use request includes use conditions, such as desired device type, device location, data transfer interval, and whether the cloud service is allowed to share the device with other cloud services. Use request receiving unit 211 receives the use request from use request transmitting unit 211 in cloud service 210 and then queries availability determining unit 222 in gateway device 220 for any available device. Availability determining unit 222 searches for an IoT device either being unused or used that meets the use request. If an available IoT device (such as IoT device 240) is found, availability determining unit 222 directs device setting unit 223 to enable the IoT device (such as IoT device 240); otherwise, it rejects the use request. Device setting unit 223 enables the designated unused device or modifies the settings of the designated device being used, according to the conditions indicated in the use request. If the settings of the IoT device (such as IoT device 240) being used are modified, configuration modification receiving unit 212 in cloud service 210 that has used the IoT device (such as IoT device 240) is notified of the modification via configuration modification notifying unit 224 in gateway device 220.

Referring to FIG. 2, when device data receiving unit 225 in gateway device 220 receives data from the IoT device (such as IoT device 240), the data is processed by device data processing unit 226 in gateway device 220, based on conditions required by the cloud service (such as cloud service 210) that is using the device. The data is then transmitted to the cloud service (such as cloud service 210) via device data transmitting unit 227 in gateway device 220. If multiple services share the device, similar processing is repeated based on conditions specified by each service. Device data receiving unit 213 on the cloud side (cloud service 210) receives the data from device data transmitting unit 227 in gateway device 220 and uses the data.

Referring to FIG. 2, device command transmitting unit 214 on the cloud side (cloud service 210) transmits a command for the IoT device (such as IoT device 240). Device command receiving unit 228 in gateway device 220 receives the command and queries command execution determining unit 229 in gateway device 220 whether the execution of the command is permitted for the designated device (IoT device 240). Command execution determining unit 229 refers to conditions on the use of the IoT device (IoT device 240) by cloud service 210 and determines whether the command can be executed. For example, if cloud service 210 shares IoT device 240 in a restrictive manner with another cloud service having a higher priority to use IoT device 240, the execution of the command may be rejected. If the execution of the command is permitted, device command transmitting unit 230 in gateway device 220 is directed to execute the command.

Figure 3A:
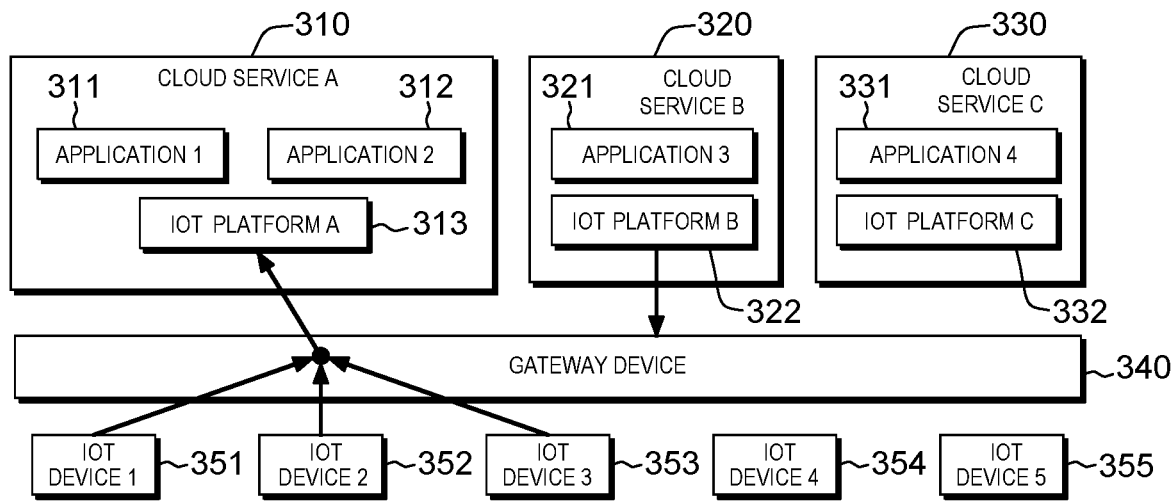
FIGS. 3(A), 3(B), and 3(C) are diagrams illustrating one configuration of a gateway device allowing multiple cloud services to access multiple IoT devices: a mode of an exclusive right to use and a first-come-first-serve basis, in accordance with one embodiment of the present invention.
Figure 3B:
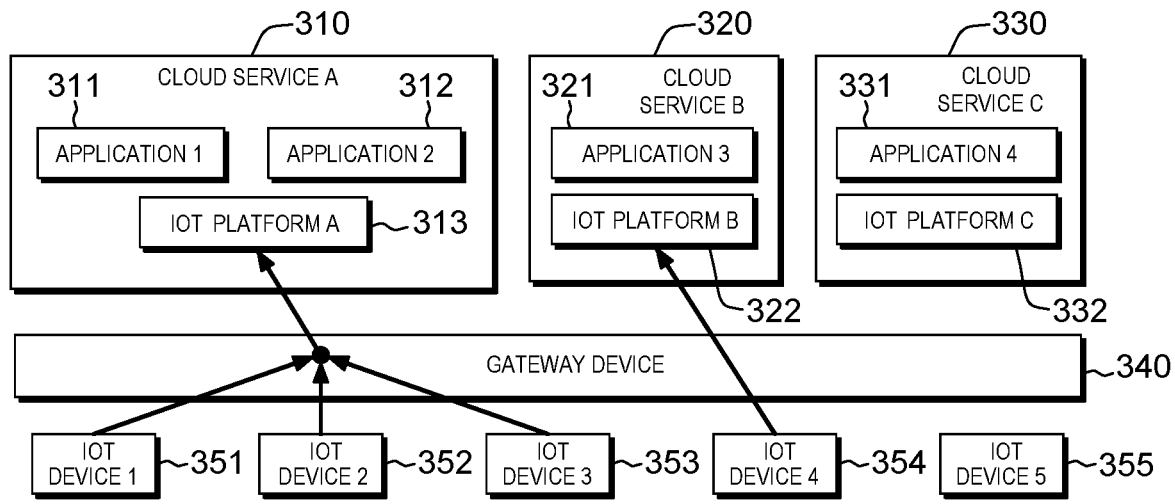
Figure 3C:
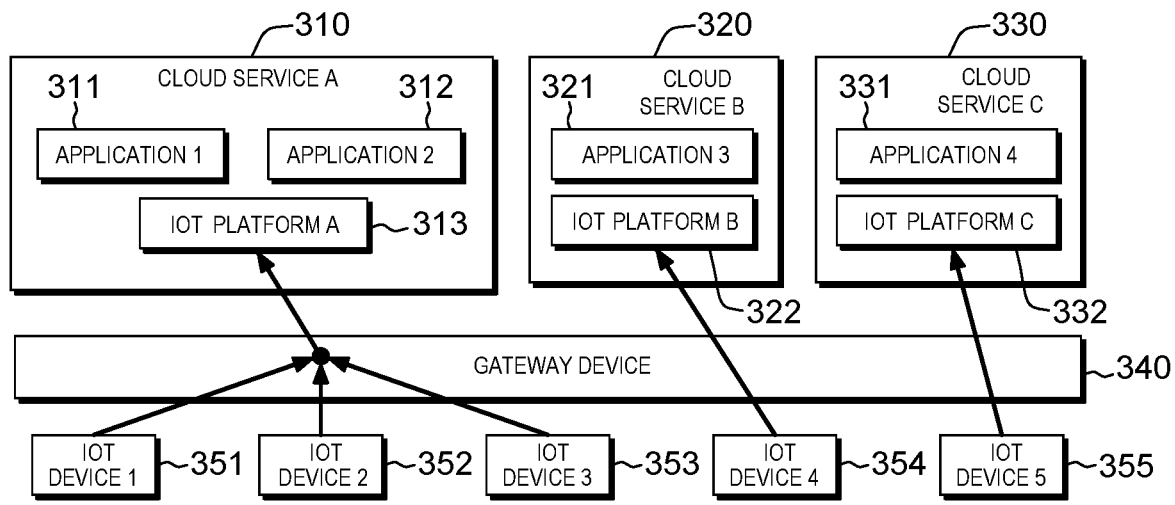

FIGS. 3(A), 3(B), and 3(C) are diagrams illustrating one configuration of a gateway device (gateway device 340) allowing multiple cloud services (namely, cloud service A 310, cloud service B 320, and cloud service C 330) to access multiple IoT devices (namely, IoT device 1 351, IoT device 2 352, IoT device 3 353, IoT device 4 354, and IoT device 5 355), in accordance with one embodiment of the present invention. The configuration shown in FIGS. 3(A), 3(B), and 3(C) has a mode of an exclusive right to use and a first-come-first-serve basis. Cloud service A 310 comprises application 1 311, application 2 312, and IoT platform A 313. Application 1 311 and application 2 312 are built on IoT platform A 313. Cloud service B 320 comprises application 3 321 and IoT platform B 322. Application 3 321 is built on IoT platform B 322. Cloud service C 330 comprises application 4 331 and IoT platform C 332. Application 4 331 is built on IoT platform C 332.

As shown in FIG. 3(A), cloud service B 320 sends a use request to gateway device 340, while cloud service A 310 is using IoT device 1 351, IoT device 2 352, and IoT device 3 353. As shown in FIG. 3(B), gateway device 340 assigns an unused device (IoT device 4 354) to cloud service B 320. As shown in FIG. 3(C), in response to cloud service C 330 transmitting another use request to gateway device 340, gateway device 340 assigns an unused device (IoT device 5 355) to cloud service C 330. In the configuration shown in FIGS. 3(A), 3(B), and 3(C), each of the cloud services are assigned an exclusive right to use unused devices. The exclusive right to use means that an application in a cloud service can solely use a device without being affected by other applications of other cloud services. The cloud service assigned the exclusive right has a right to refer to data as well as a right to execute all available commands.

Figure 4A:
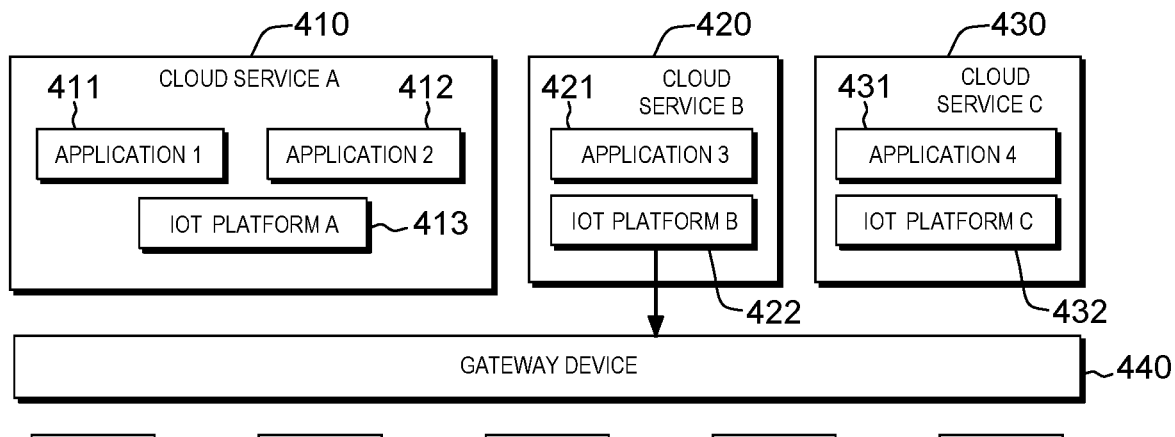
FIGS. 4(A), 4(B), and 4(C) are diagrams illustrating another configuration of a gateway device allowing multiple cloud services to access multiple IoT devices: a mode of an exclusive right to use and a priority right basis, in accordance with another embodiment of the present invention.
Figure 4B:
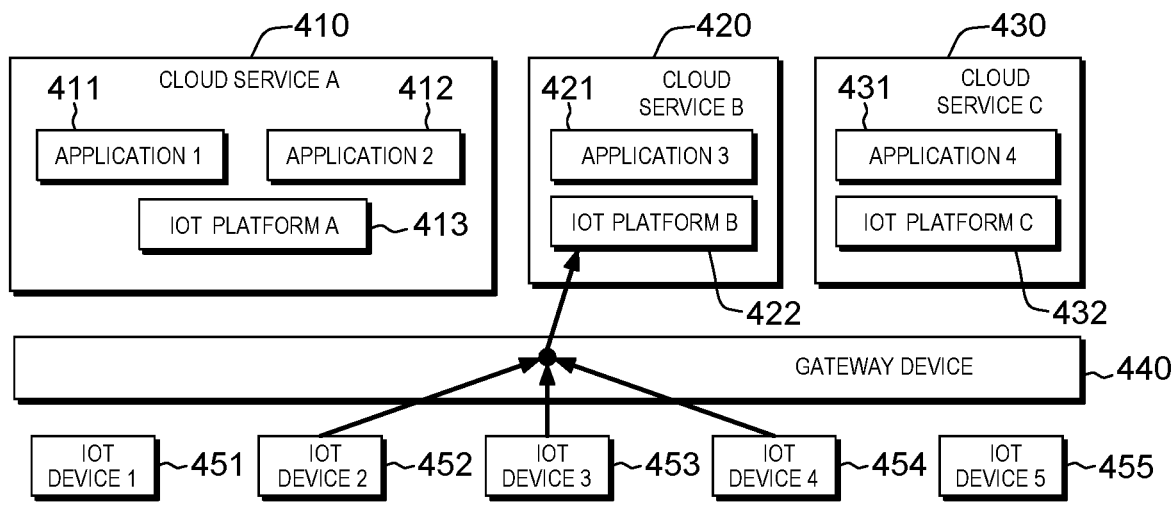
Figure 4C:
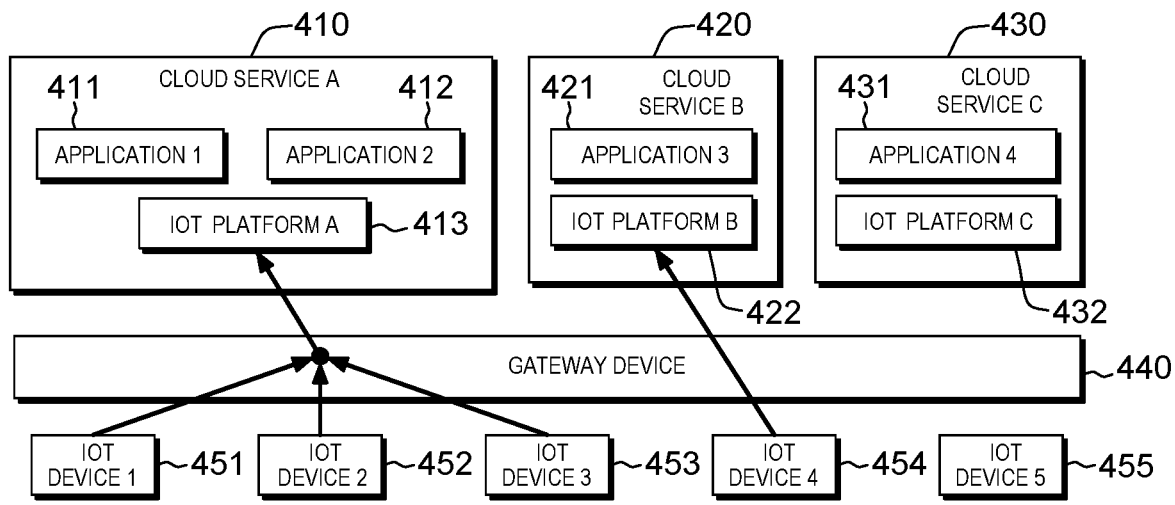

FIGS. 4(A), 4(B), and 4(C) are diagrams illustrating another configuration of a gateway device (gateway device 440) allowing multiple cloud services (namely, cloud service A 410, cloud service B 420, and cloud service C 430) to access multiple IoT devices (namely, IoT device 1 451, IoT device 2 452, IoT device 3 453, IoT device 4 454, and IoT device 5 455), in accordance with another embodiment of the present invention. The configuration shown in FIGS. 4(A), 4(B), and 4(C) has a mode of an exclusive right to use and a priority right basis. Cloud service A 410 comprises application 1 411, application 2 412, and IoT platform A 413. Application 1 411 and application 2 412 are built on IoT platform A 413. Cloud service B 420 comprises application 3 421 and IoT platform B 422. Application 3 421 is built on IoT platform B 422. Cloud service C 430 comprises application 4 431 and IoT platform C 432. Application 4 431 is built on IoT platform C 432.

As shown in FIG. 4(A), cloud service B 420 sends a use request to gateway device 440, while cloud service A 410 is inactive. Cloud service A 410 has a higher priority to use certain IoT devices than cloud service B 420. As shown in FIG. 4(B), gateway device 440 assigns IoT device 2 452, IoT device 3 453, and IoT device 4 454 (which are unused devices) to cloud service B 420. At this point, cloud service B 420 has an exclusive right to uses IoT device 2 452, IoT device 3 453, and IoT device 4 454. As shown in FIG. 4(C), in response to cloud service A 410 transmitting a use request to gateway device 440 (i.e., cloud service A 410 becoming active), gateway device 440 assigns an unused IoT device (IoT device 1 451) and IoT devices being used (IoT device 2 452 and IoT device 3 453) to cloud service A 410; use of IoT device 2 452 and IoT device 3 453 by cloud service B 420 is terminated. In the configuration shown in FIGS. 4(A), 4(B), and 4(C), each of the cloud services has an exclusive right to use assigned unused devices but may be deprived of the exclusive right to use the devices by a higher-priority cloud service (such as cloud service A 410).

Figure 5A:
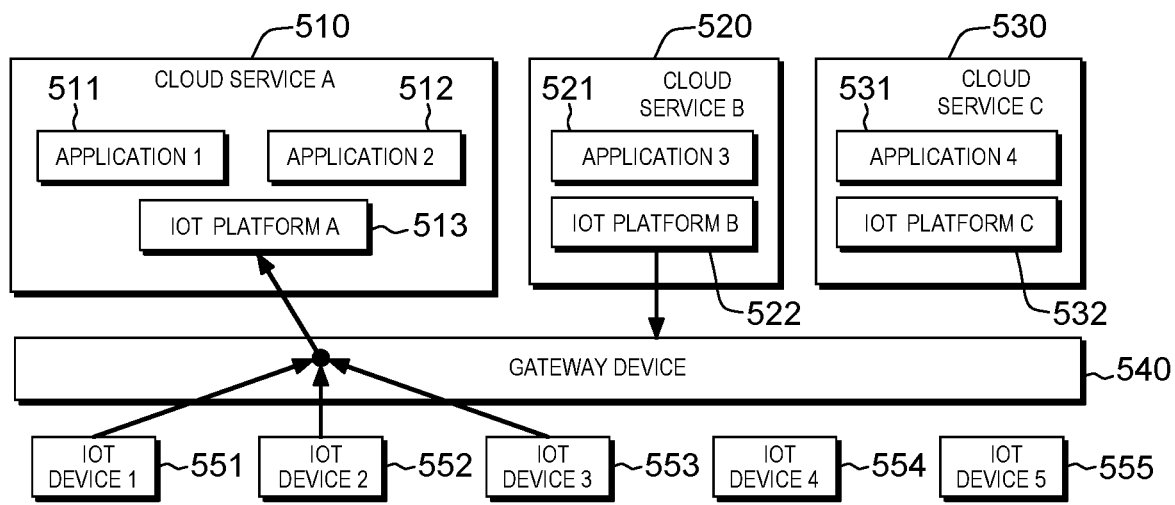
FIGS. 5(A), 5(B), and 5(C) are diagrams illustrating yet another configuration of a gateway device allowing multiple cloud services to access multiple IoT devices: a mode of simple sharing and a first-come-first-serve basis, in accordance with yet another embodiment of the present invention.
Figure 5B:
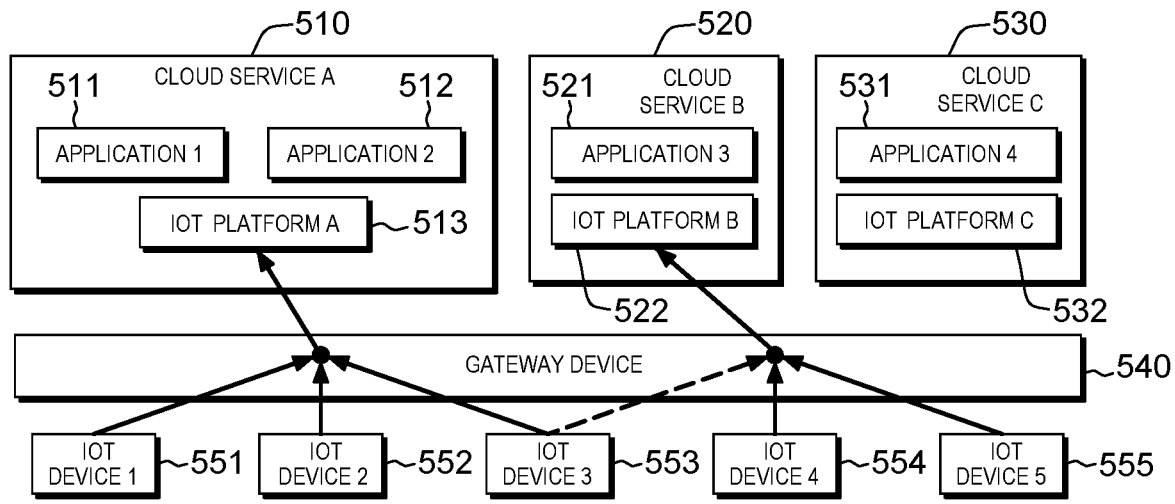
Figure 5C:
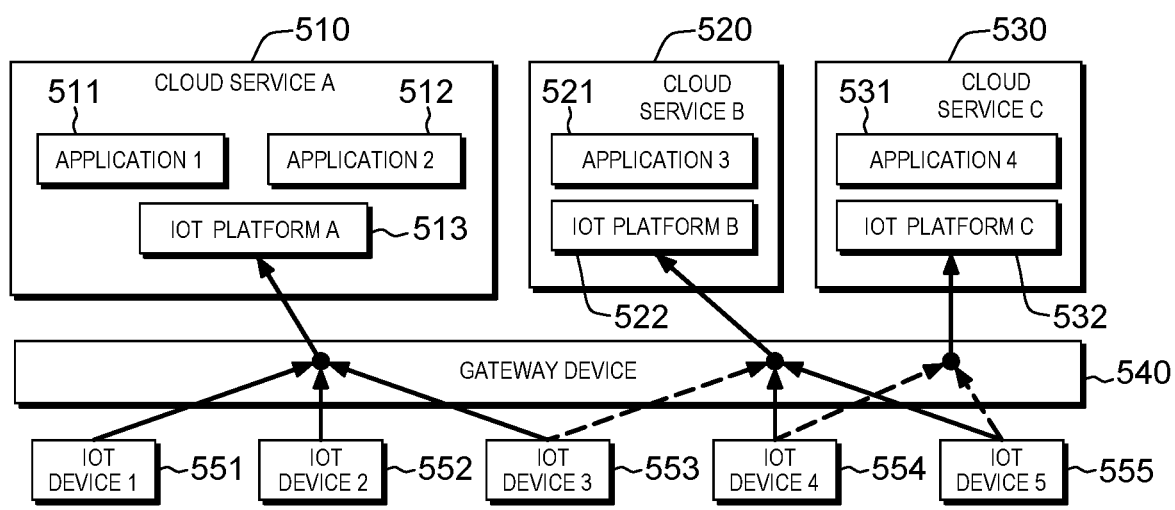

FIGS. 5(A), 5(B), and 5(C) are diagrams illustrating yet another configuration of a gateway device (gateway device 540) allowing multiple cloud services (namely, cloud service A 510, cloud service B 520, and cloud service C 530) to access multiple IoT devices (namely, IoT device 1 551, IoT device 2 552, IoT device 3 553, IoT device 4 554, and IoT device 5 555), in accordance with yet another embodiment of the present invention. The configuration shown in FIGS. 5(A), 5(B), and 5(C) represents a mode of simple sharing and a first-come-first-serve basis. Cloud service A 510 comprises application 1 511, application 2 512, and IoT platform A 513. Application 1 511 and application 2 512 are built on IoT platform A 513. Cloud service B 520 comprises application 3 521 and IoT platform B 522. Application 3 521 is built on IoT platform B 522. Cloud service C 530 comprises application 4 531 and IoT platform C 532. Application 4 531 is built on IoT platform C 532.

As shown in FIG. 5(A), cloud service B 520 sends a use request to gateway device 540, while cloud service A 510 is using IoT device 1 551, IoT device 2 552, and IoT device 3 553. As shown in FIG. 5(B), gateway device 540 assigns unused IoT devices (IoT device 4 554 and IoT device 5 555) to cloud service B 520. Also, gateway device 540 restrictively assigns IoT device 3 553 (which is being used by cloud service A 510) to cloud service B 520. Restrictively assigned to use IoT device 3 553, cloud service B 520 is lack of a right to execute particular commands and a right to modify device configurations. As shown in FIG. 5(C), in response to cloud service C 530 transmitting a use request to gateway device 540, gateway device 540 restrictively assigns IoT device 4 554 and IoT device 5 555 (which are being used by cloud service B 520) to cloud service C 530. Thus, cloud service C 530 restrictively uses IoT device 4 554 and IoT device 5 555; cloud service C 530 is lack of a right to execute particular commands on IoT device 4 554 and IoT device 5 555 and a right to modify configurations of IoT device 4 554 and IoT device 5 555. In the configuration shown in FIGS. 5(A), 5(B), and 5(C), each of application may restrictively use devices being used by other applications, in addition to exclusively assigned unused devices. In FIGS. 5(A), 5(B), and 5(C), solid lines illustrate exclusive use of the devices by the cloud services, while dashed lines illustrate restrictive use of the devices by the cloud services.

Figure 6A:
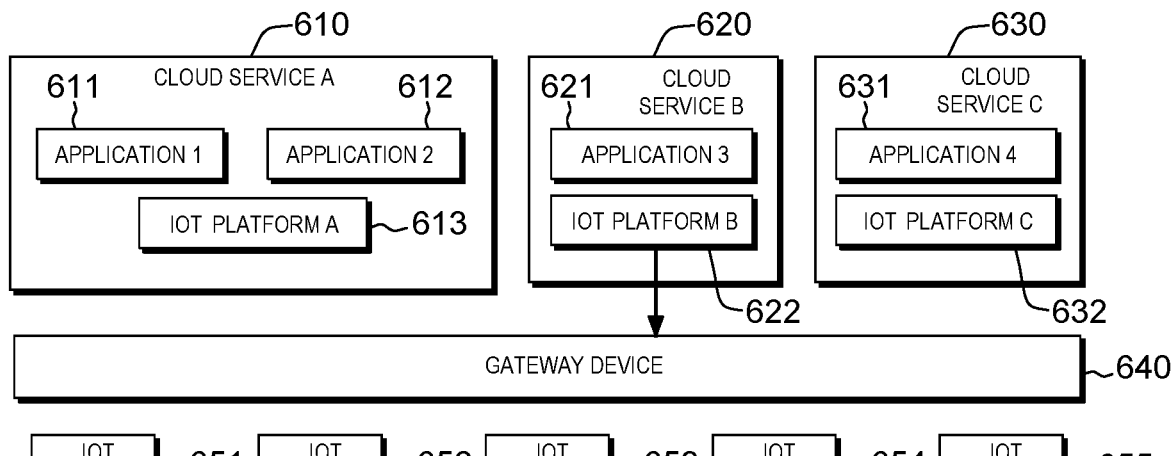
FIGS. 6(A), 6(B), and 6(C) are diagrams illustrating yet another configuration of a gateway device allowing multiple cloud services to access multiple IoT devices: a mode of simple sharing and a priority right basis, in accordance with yet another embodiment of the present invention.
Figure 6B:
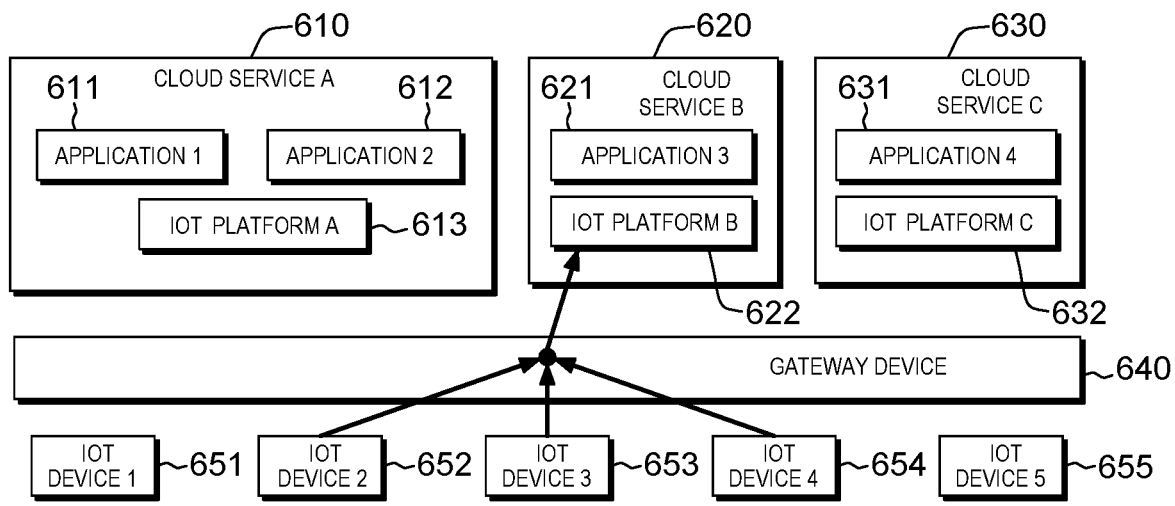
Figure 6C:
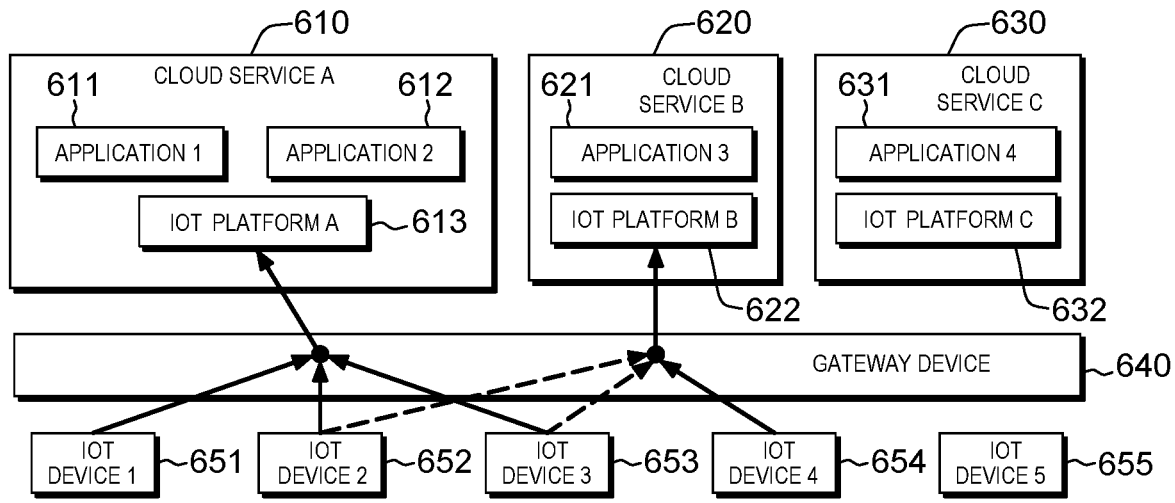

FIGS. 6(A), 6(B), and 6(C) are diagrams illustrating yet another configuration of a gateway device (gateway device 640) allowing multiple cloud services (namely, cloud service A 610, cloud service B 620, and cloud service C 630) to access multiple IoT devices (namely, IoT device 1 651, IoT device 2 652, IoT device 3 653, IoT device 4 654, and IoT device 5 655), in accordance with yet another embodiment of the present invention. The configuration shown in FIGS. 6(A), 6(B), and 6(C) has a mode of simple sharing and a priority right basis. Cloud service A 610 comprises application 1 611, application 2 612, and IoT platform A 613. Application 1 611 and application 2 612 are built on IoT platform A 613. Cloud service B 620 comprises application 3 621 and IoT platform B 622. Application 3 621 is built on IoT platform B 622. Cloud service C 630 comprises application 4 631 and IoT platform C 632. Application 4 631 is built on IoT platform C 632.

As shown in FIG. 6(A), cloud service B 620 sends a use request to gateway device 640, while cloud service A 610 is inactive. Cloud service A 610 has a higher priority to use IoT devices than cloud service B 620. As shown in FIG. 6(B), gateway device 640 assigns IoT device 2 652, IoT device 3 653, and IoT device 4 654 (which are unused devices) to cloud service B 620. At this point, cloud service B 620 has an exclusive right to use IoT device 2 652, IoT device 3 653, and IoT device 4 654. As shown in FIG. 6(C), in response to cloud service A 610 transmitting a use request to gateway device 640 (i.e, cloud service A 610 becoming active), gateway device 640 assigns an unused IoT device (IoT device 1 651) and IoT devices being used (IoT device 2 652 and IoT device 3 653) to cloud service A 610; gateway device 640 assigns cloud service A 610 a right to control IoT device 2 652 and IoT device 3 653. While cloud service B 620 hands over the right of controlling IoT device 2 652 and IoT device 3 653 to cloud service A 610, cloud service B 620 restrictively uses IoT device 2 652 and IoT device 3 653. Even though cloud service B 620 is deprived of the control right, cloud service B 620 can use IoT device 2 652 and IoT device 3 653 within an allowable range. In the configuration shown in FIGS. 6(A), 6(B), and 6(C), each of the cloud services exclusively uses assigned unused devices but may be deprived of the right to control the devices by a higher-priority cloud service (such as cloud service A 610). In FIGS. 6(A), 6(B), and 6(C), solid lines illustrate exclusive use of the devices by the cloud services, while dashed lines illustrate restrictive use of the devices by the cloud services.

Figure 7A:
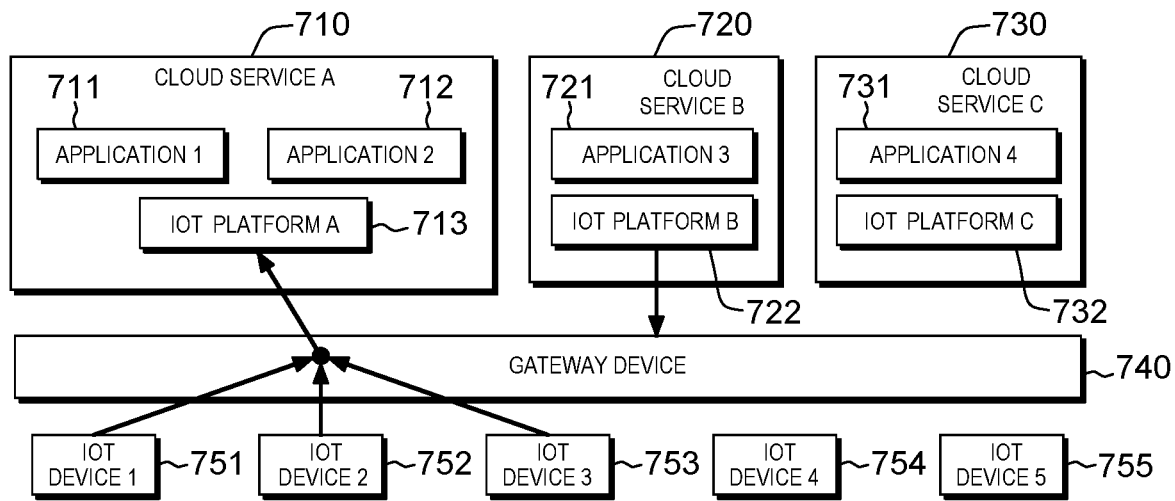
FIGS. 7(A), 7(B), and 7(C) are diagrams illustrating yet another configuration of a gateway device allowing multiple cloud services to access multiple IoT devices: a mode of time sharing, in accordance with yet another embodiment of the present invention.
Figure 7B:
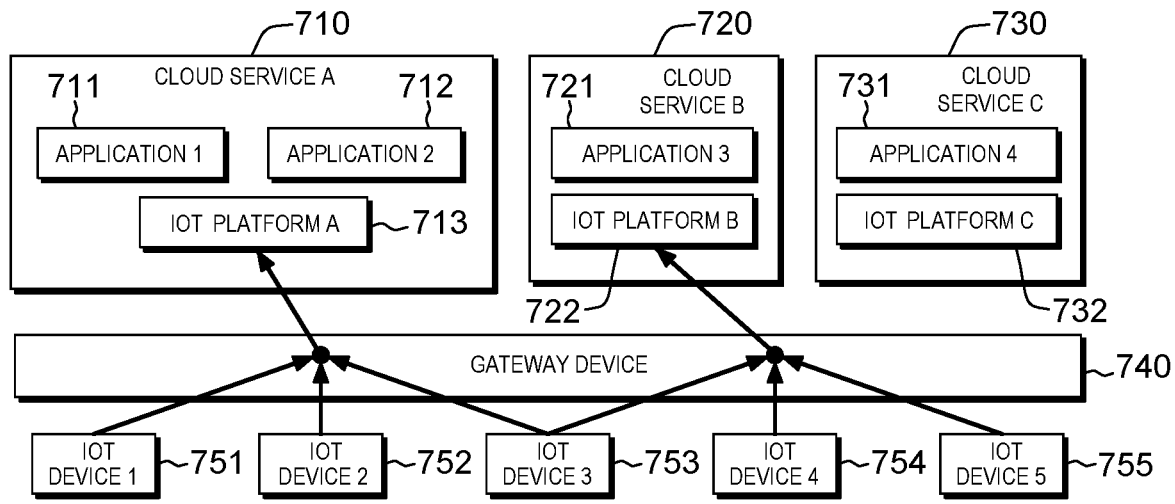
Figure 7C:
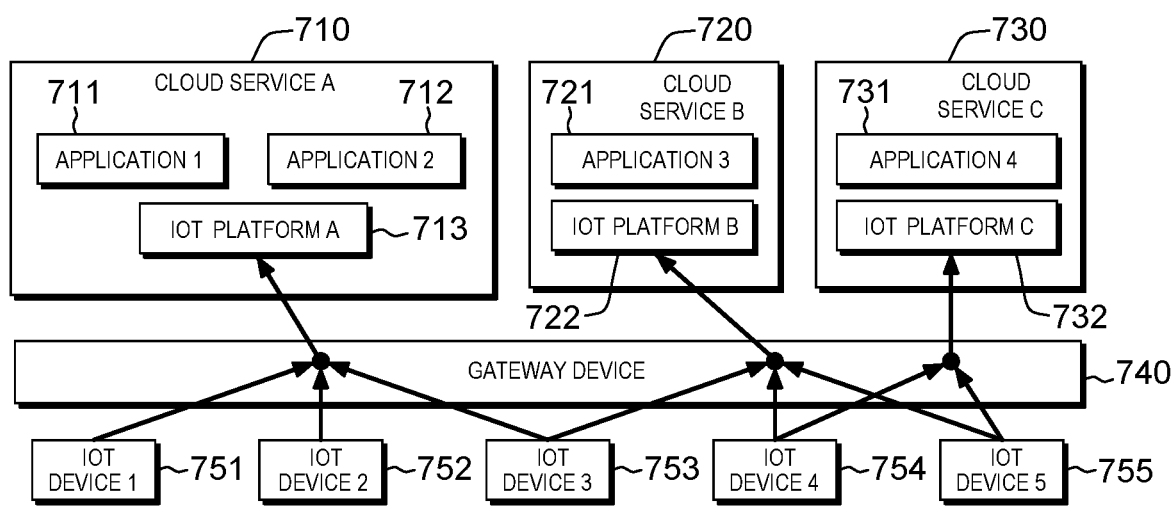

FIGS. 7(A), 7(B), and 7(C) are diagrams illustrating yet another configuration of a gateway device (gateway device 740) allowing multiple cloud services (namely, cloud service A 710, cloud service B 720, and cloud service C 730) to access multiple IoT devices (namely, IoT device 1 751, IoT device 2 752, IoT device 3 753, IoT device 4 754, and IoT device 5 755), in accordance with yet another embodiment of the present invention. The configuration shown in FIGS. 7(A), 7(B), and 7(C) has a mode of time sharing. Cloud service A 710 comprises application 1 711, application 2 712, and IoT platform A 713. Application 1 711 and application 2 712 are built on IoT platform A 713. Cloud service B 720 comprises application 3 721 and IoT platform B 722. Application 3 721 is built on IoT platform B 722. Cloud service C 730 comprises application 4 731 and IoT platform C 732. Application 4 731 is built on IoT platform C 732.

As shown in FIG. 7(A), cloud service B 720 sends a use request to gateway device 740, while cloud service A 710 is using IoT device 1 751, IoT device 2 752, and IoT device 3 753. As shown in FIG. 7(B), gateway device 740 assigns unused IoT devices (IoT device 4 754 and IoT device 5 755) to cloud service B 720. Additionally, gateway device 740 assigns an IoT device (IoT device 3 753) being used by cloud service A 710 to cloud service B 720, in a time sharing manner. With the time sharing manner, gateway device 740 assigns an exclusive right to use IoT device 3 753 alternatively to cloud service A 710 and cloud service B 720, according to predetermined respective durations of use allowed for cloud service A 710 and cloud service B 720. As shown in FIG. 7(C), in response to cloud service C 730 transmitting a use request to gateway device 740, gateway device 740 assigns IoT device 4 754 and IoT device 5 755 (which are used by cloud service B 720) to cloud service C 730, in a time sharing manner. With the time sharing manner, gateway device 740 assigns an exclusive right to use IoT device 4 754 and IoT device 5 755 alternatively to cloud service B 720 and cloud service C 730, according to predetermined respective durations of use allowed for cloud service B 720 and cloud service C 730.

Figure 8:
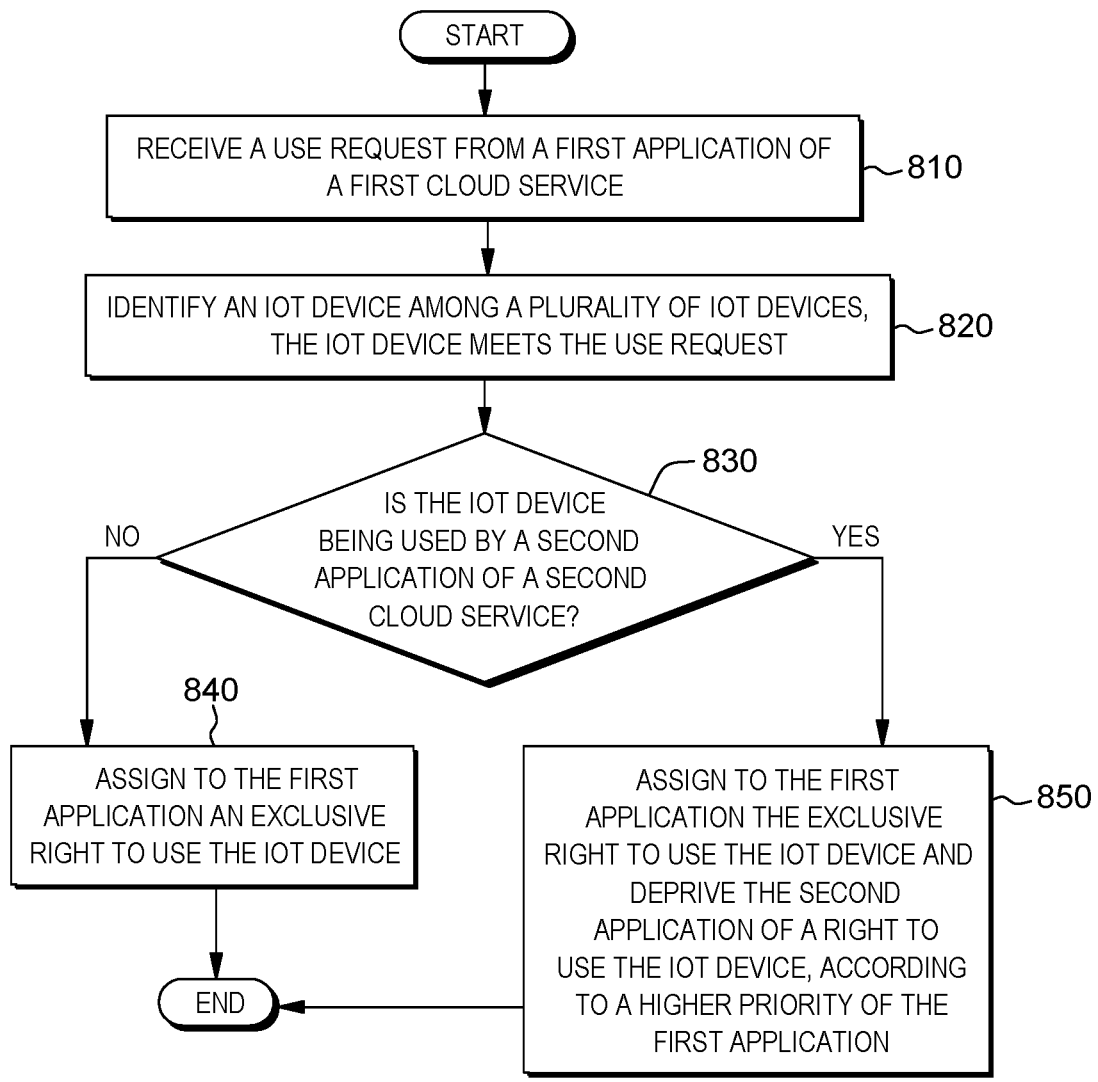
FIG. 8 is a flowchart showing operational steps for a gateway device allowing multiple cloud services to access multiple IoT devices, with a mode of an exclusive right to use, in accordance with one embodiment of the present invention.

FIG. 8 is a flowchart showing operational steps for a gateway device (gateway device 340 or 440 shown in FIG. 3 or 4) allowing multiple cloud services (namely, cloud service A 310 or 410, cloud service B 320 or 420, and cloud service C 330 or 430 shown in FIG. 3 or 4) to access multiple IoT devices (namely, IoT device 1 351 or 451, IoT device 2 352 or 452, IoT device 3 353 or 453, IoT device 4 354 or 454, and IoT device 5 355 or 455 shown in FIG. 3 or 4), with a mode of an exclusive right to use, in accordance with one embodiment of the present invention. At step 810, a gateway device receives a use request from a first application of a first cloud service (or infrastructural service). At step 820, the gateway device identifies, among a plurality of IoT devices, an IoT device which meets conditions of the use request. At step 830, the gateway device determines whether the identified IoT device is being used by a second application of a second cloud service (or infrastructural service). In response to determining that the identified IoT device is not being used by the second application of the second cloud service (or infrastructural service) (NO branch of step 830), at step 840, the gateway device assigns to the first application an exclusive right to use the identified IoT device. With the exclusive right, the first application can solely use a device without being affected by other applications; therefore, the first application assigned the exclusive right has a right to refer to data as well as a right to execute all available commands. For example, as shown in FIG. 3(A), gateway device 340 receives the use request from application 3 321 (as the first application) of cloud service B 320 (as the first cloud service); as shown in FIG. 3(B), gateway device 340 identifies IoT device 4 354 as the one that meets the conditions of the use request; as shown in FIG. 3(C), in response to determining that IoT device 4 354 is not being used by application 1 311 or application 2 312 (which is the second application) of cloud service A 310 (which is the second cloud service), gateway device 340 assigns application 3 321 the exclusive right to use IoT device 4 354.

In response to determining that the identified IoT device is being used by the second application of the second cloud service (or infrastructural service) (YES branch of step 830), at step 850, the gateway device assigns to the first application the exclusive right to use the device and deprives the second application of a right to use the device, according to a higher priority of the first application. For example, in the gateway device's configuration described previously with reference to FIGS. 4(B) and and 4(C), gateway device 440 receives the use request from application 1 411 or application 2 412 (which is here the first application) of cloud service A 410 (which is here the first cloud service) and identifies IoT device 3 453 as the one that meets the conditions of the use request. As shown in FIG. 4(C), in response to determining that IoT device 2 452 and IoT device 3 453 are being used by application 3 421 (which is here the second application) of cloud service B 420 (which is here the second cloud service), gateway device 440 assigns application 1 411 or application 2 412 the exclusive right to use IoT device 2 452 and IoT device 3 453 and deprives application 2 421 of the right to use IoT device 2 452 and IoT device 3 453, according to a higher priority of application 1 411 or application 2 412 than application 3 421.

Figure 9:
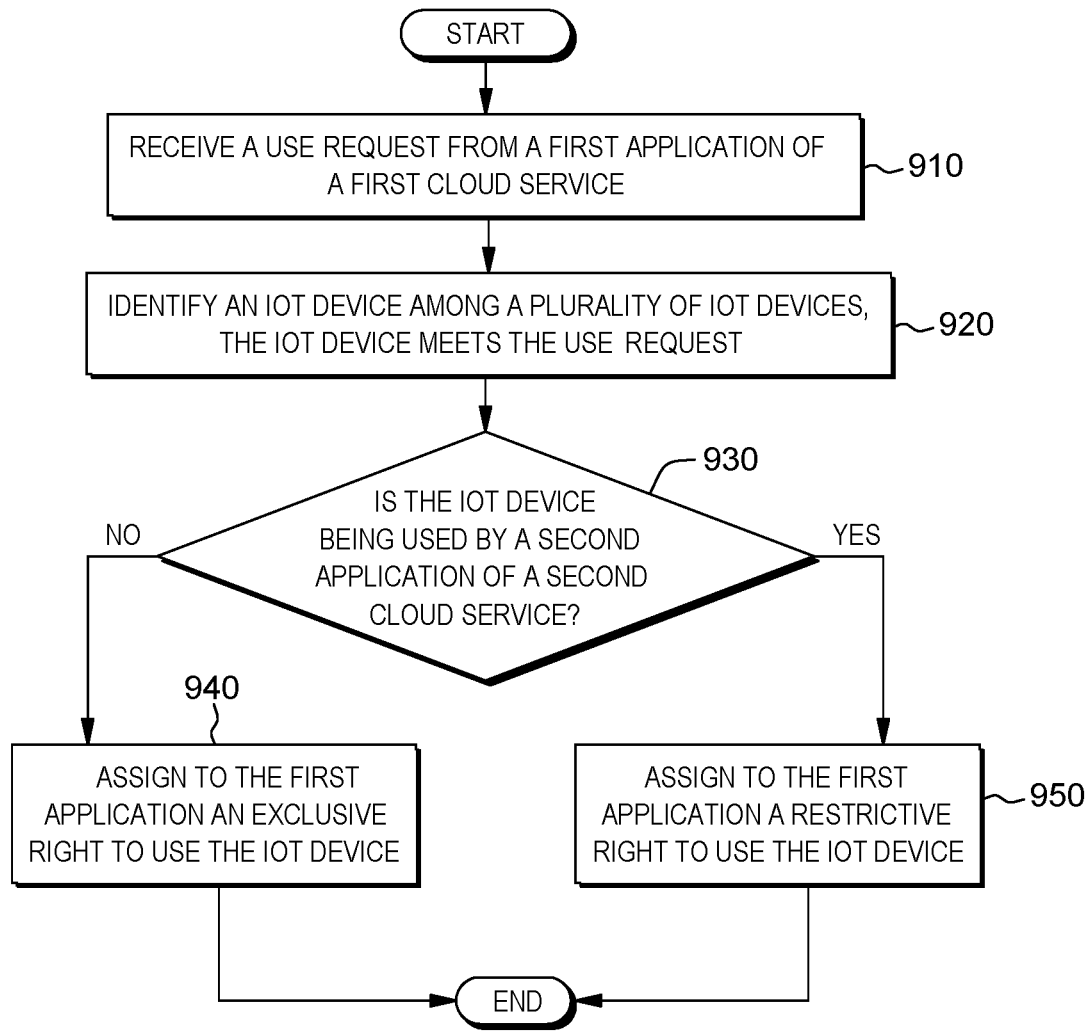
FIG. 9 is a flowchart showing operational steps for a gateway device allowing multiple cloud services to access multiple IoT devices, with a mode of simple sharing and a first-come-first-serve basis, in accordance with one embodiment of the present invention.

FIG. 9 is a flowchart showing operational steps for a gateway device (gateway device 540 shown in FIG. 5) allowing multiple cloud services (namely, cloud service A 510, cloud service B 520, and cloud service C 530 shown in FIG. 5) to access multiple IoT devices (namely, IoT device 1 551, IoT device 2 552, IoT device 3 553, IoT device 4 554, and IoT device 5 555 shown in FIG. 5), with a mode of simple sharing and a first-come-first-serve basis, in accordance with one embodiment of the present invention. At step 910, a gateway device receives a use request from a first application in a first cloud service (or infrastructural service). At step 920, the gateway device identifies, among a plurality of IoT devices, an IoT device which meets conditions of the use request. At step 930, the gateway device determines whether the identified IoT device is being used by a second application of a second cloud service (or infrastructural service). In response to determining that the identified IoT device is not being used by the second application of the second cloud service (or infrastructural service) (NO branch of step 930), at step 940, the gateway device assigns to the first application an exclusive right to use the identified IoT device.

In response to determining that the identified IoT device is being used by the second application of the second cloud service (or infrastructural service) (YES branch of step 930), at step 950, the gateway device assigns to the first application a restrictive right to use the device. With the restrictive right, the first application's execution of certain commands for the IoT device is restricted. The commands to be restricted are operations that affect other applications including, for example, changing the data transfer interval, changing the device location, and controlling the orientation of a monitoring camera. Even when the device is restrictively used, operations that do not affect other applications and data reference are not restricted. With the restrictive right, the first application cannot modify configurations of the IoT device. With the restrictive right, the first application must use the same IoT device setting used by the second application. For example, as shown in FIG. 5(A), IoT device 3 553 is being used by application 1 511 or application 2 512 (which is here the second application) of cloud service A 510 (which is here the second cloud service) when application 3 521 (which is here the first application) of cloud service B 520 (which is here the first cloud service) requests to use IoT device 3 553; in response to determining that IoT device 3 553 is being used by application 1 511 or application 2 512 (which is the second application) of cloud service A 510 (which is the second cloud service), gateway device 540 assigns to application 3 521 the restrictive right to use IoT device 3 553.

Figure 10:
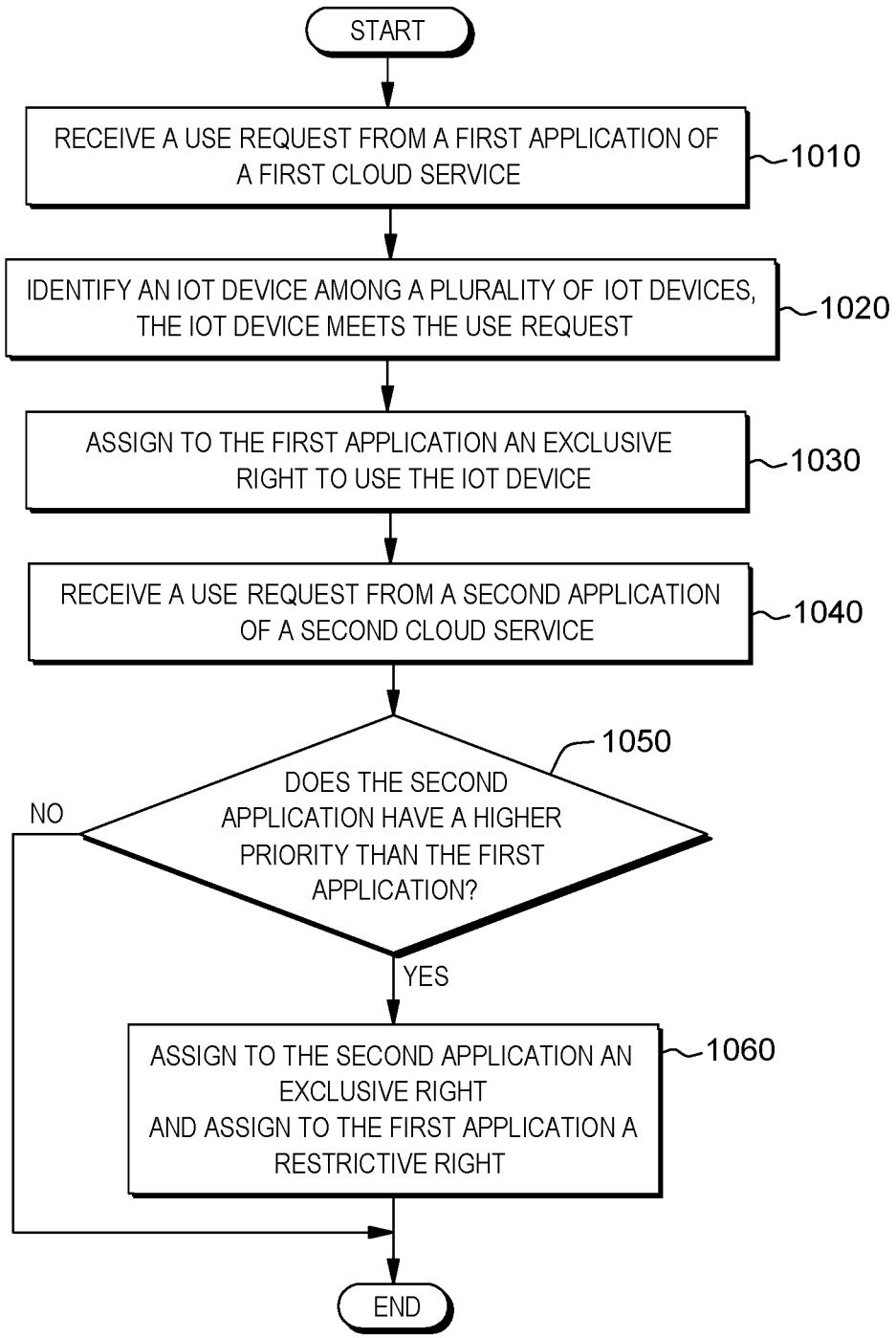
FIG. 10 is a flowchart showing operational steps for a gateway device allowing multiple cloud services to access multiple IoT devices, with a mode of simple sharing and a priority right basis, in accordance with one embodiment of the present invention.

FIG. 10 is a flowchart showing operational steps for a gateway device (gateway device 640 shown in FIG. 6) allowing multiple cloud services (namely, cloud service A 610, cloud service B 620, and cloud service C 630 shown in FIG. 6) to access multiple IoT devices (namely, IoT device 1 651, IoT device 2 652, IoT device 3 653, IoT device 4 654, and IoT device 5 655 shown in FIG. 6), with a mode of simple sharing and a priority right basis, in accordance with one embodiment of the present invention. At step 1010, a gateway device receives a use request from a first application of a first cloud service (or infrastructural service). At step 1020, the gateway device identifies, among a plurality of IoT devices, an IoT device which meets conditions of the use request. At step 1030, the gateway device assigns to the first application an exclusive right to use the IoT device. At step 1040, the gateway device receives a use request from a second application of a second cloud service (or infrastructural service). At step 1050, the gateway device determines whether the second application has a higher priority than the first application. In response to determining that the second application has the higher priority than the first application (YES branch of step 1050), the gateway device assigns to the second application an exclusive right and assigns to the first application a restrictive right. In response to determining that the second application does not have the higher priority than the first application (NO branch of step 1050), the gateway device will either rejects the use request for the second application or assigns the second application a restrictive right.

For example, as shown in FIG. 6(A), gateway device 640 receives the use request from application 3 621 (as the first application) of cloud service B 620 (as the first cloud service); as shown in FIG. 6(B), gateway device 640 identifies IoT device 2 652, IoT device 3 653, and IoT device 4 654 as the ones that meet the conditions of the use request, and gateway device 640 assigns to application 3 621 the exclusive right to use IoT device 2 652, IoT device 3 653, and IoT device 4 654. Then, gateway device 640 receives the use request from application 1 611 or application 2 612 (as the second application) of cloud service A 610 (as the second cloud service); application 1 611 or application 2 612 requests to use IoT device 2 652 and IoT device 3 653. Gateway device 640 determines whether application 1 611 or application 2 612 has the higher priority than application 3 621. As shown in FIG. 6(C), in response to determining that application 1 611 or application 2 612 has the higher priority than application 3 621, gateway device 640 assigns to application 1 611 or application 2 612 an exclusive right and assigns to application 3 621 a restrictive right; thus, application 1 611 or application 2 612 has the exclusive right to use IoT device 2 652, IoT device 3 653 and application 3 621 has the restrictive right to use IoT device 2 652 and IoT device 3 653.

Figure 11:
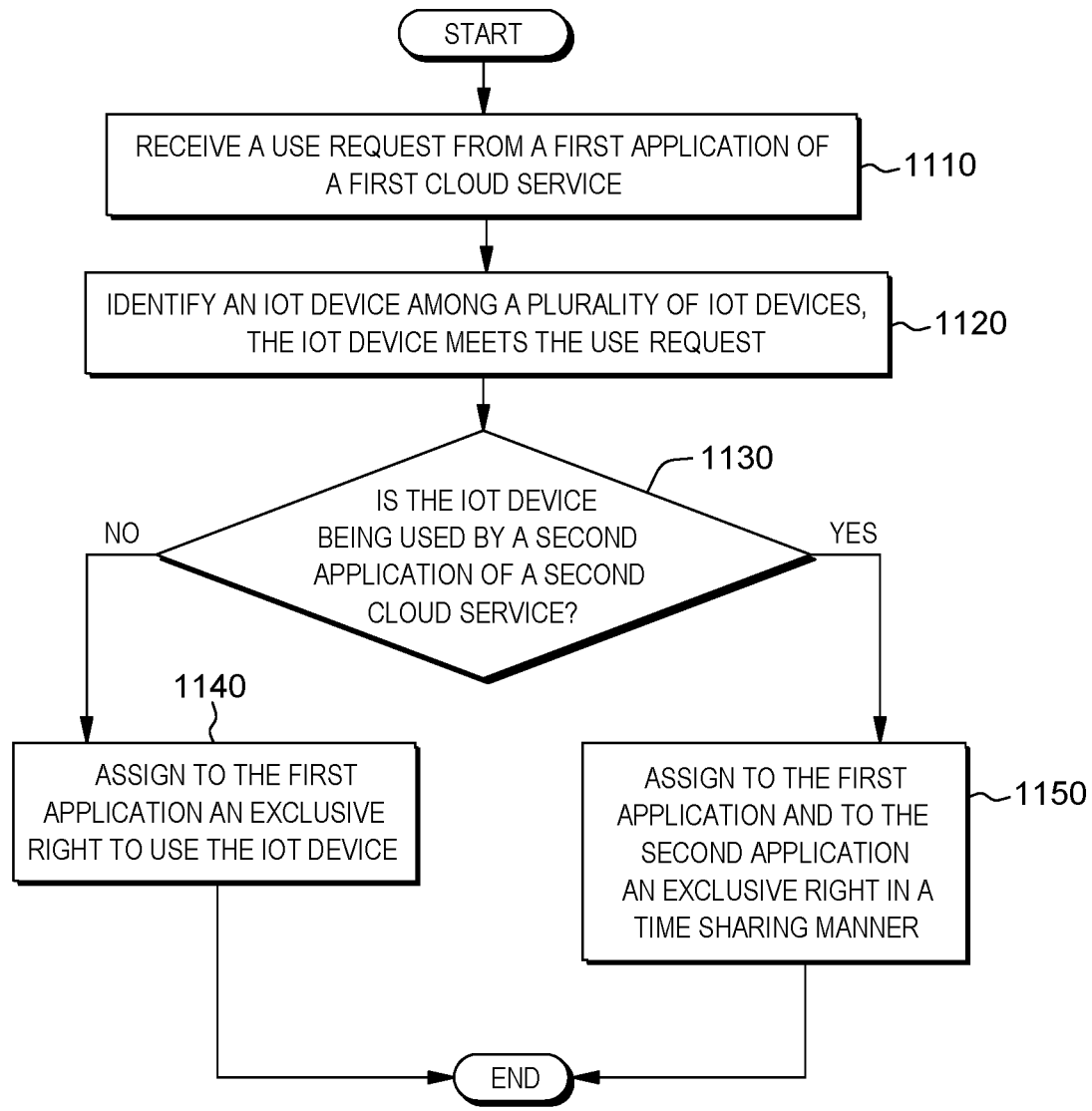
FIG. 11 is a flowchart showing operational steps for a gateway device allowing multiple cloud services to access multiple IoT devices, with a mode of time sharing, in accordance with one embodiment of the present invention.

FIG. 11 is a flowchart showing operational steps for a gateway device (gateway device 740 shown in FIG. 7) allowing multiple cloud services (namely, cloud service A 710, cloud service B 720, and cloud service C 730 shown in FIG. 7) to access multiple IoT devices (namely, IoT device 1 751, IoT device 2 752, IoT device 3 753, IoT device 4 754, and IoT device 5 755 shown in FIG. 7), with a mode of time sharing, in accordance with one embodiment of the present invention.

At step 1110, a gateway device receives a use request from a first application in a first cloud service (or infrastructural service). At step 1120, the gateway device identifies, among a plurality of IoT devices, an IoT device which meets conditions of the use request. At step 1130, the gateway device determines whether the identified IoT device is being used by a second application of a second cloud service (or infrastructural service). In response to determining that the identified IoT device is not being used by the second application of the second cloud service (or infrastructural service) (NO branch of step 1130), at step 1140, the gateway device assigns to the first application an exclusive right to use the identified IoT device. In response to determining that the identified IoT device is being used by the second application of the second cloud service (or infrastructural service) (YES branch of step 1130), at step 1150, the gateway device assigns to the first application and to the second application an exclusive right in a time sharing manner to use the IoT device. With the time sharing manner, the gateway device assigns an exclusive right to use the IoT device alternatively to the first application and to the second application, according to predetermined respective durations of use allowed for the first application and the second application.

For example, as shown in FIG. 7(A), gateway device 740 receives the use request from application 3 721 (as the first application) of cloud service B 720 (as the first cloud service) and identifies IoT device 3 753 (along with IoT device 4 754 and IoT device 5 755) as the one that meets the conditions of the use request. As shown in FIG. 7(B), in response to determining that IoT device 3 753 is being used by the second application (application 1 711 or application 2 712) of the second cloud service (cloud service A 710), gateway device 740 assigns an exclusive right to use IoT device 3 753 alternatively to application 1 711 (or application 2 712) and application 3 721, according to predetermined respective durations of use allowed for application 1 711 (or application 2 712) and application 3 721.

Figure 12:
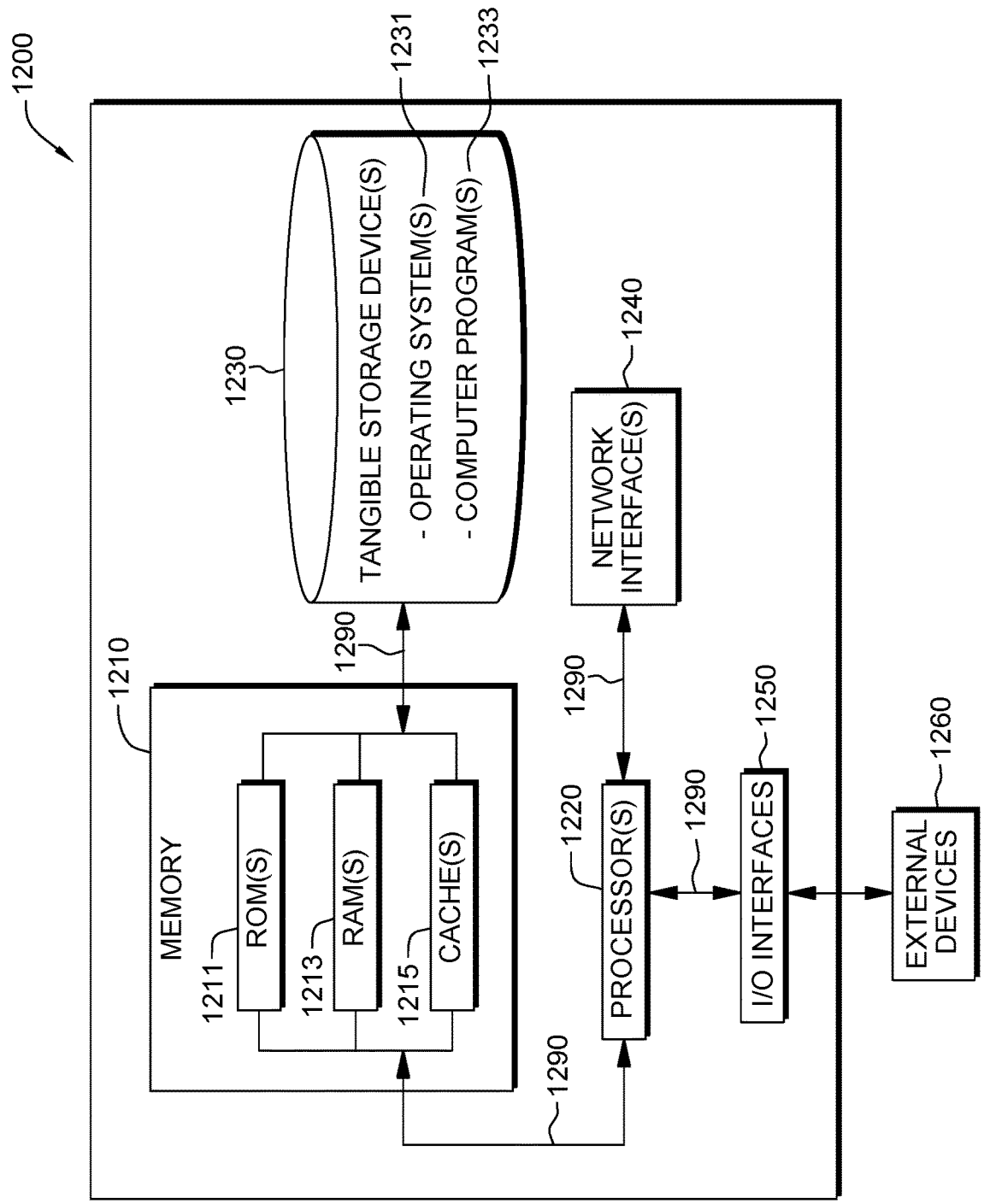
FIG. 12 is a diagram illustrating components of a computing device or a server, in accordance with one embodiment of the present invention.
Figure 13:
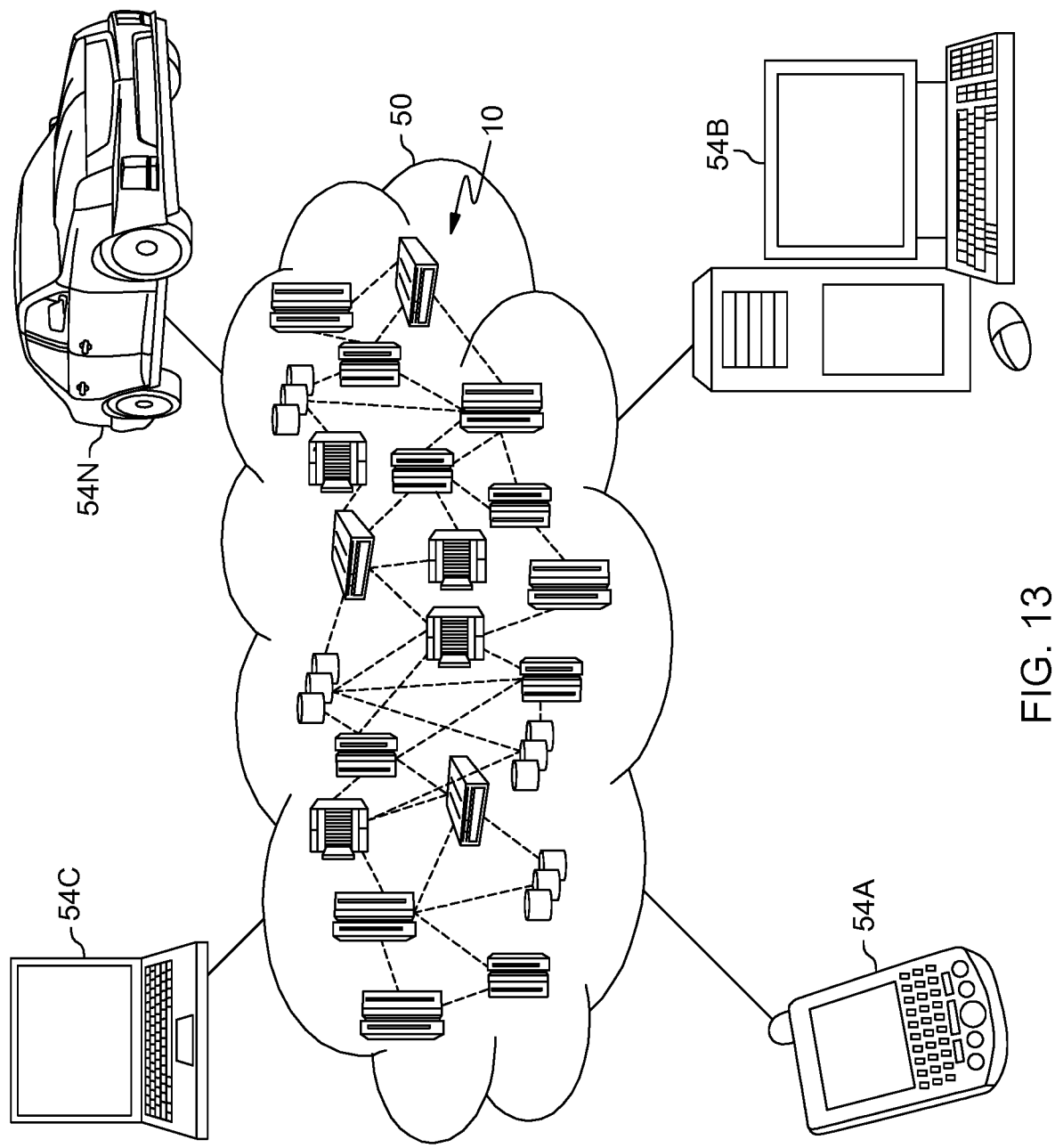
FIG. 13 depicts a cloud infrastructure environment, in accordance with one embodiment of the present invention.
Figure 14:
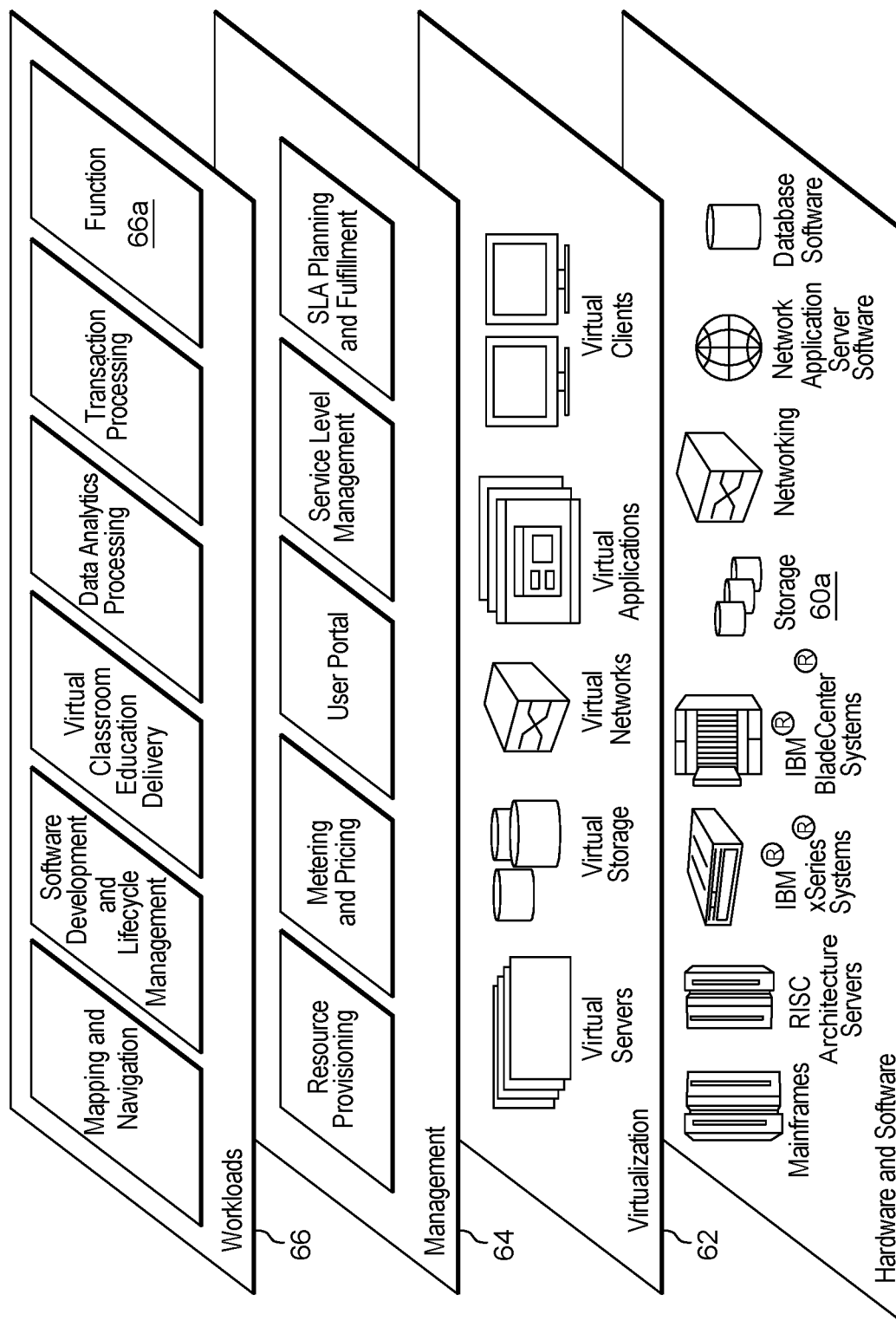
FIG. 14 depicts abstraction model layers in a cloud infrastructure environment, in accordance with one embodiment of the present invention.

FIG. 12 is a diagram illustrating components of computing device or server 1200 (such as cloud service A 110, cloud service B 120, cloud service C 130, gateway device 140, and IoT devices 151 through 155, all shown in FIG. 1), in accordance with one embodiment of the present invention. It should be appreciated that FIG. 12 provides only an illustration of one implementation and does not imply any limitations with regard to the environment in which different embodiments may be implemented.

Referring to FIG. 12, computing device 1200 includes processor(s) 1220, memory 1210, and tangible storage device(s) 1230. In FIG. 12, communications among the above-mentioned components of computing device 1200 are denoted by numeral 1290. Memory 1210 includes ROM(s) (Read Only Memory) 1211, RAM(s) (Random Access Memory) 1213, and cache(s) 1215. One or more operating systems 1231 and one or more computer programs 1233 reside on one or more computer readable tangible storage device(s) 1230.

Computing device 1200 further includes I/O interface(s) 1250. I/O interface(s) 1250 allows for input and output of data with external device(s) 1260 that may be connected to computing device 1200. Computing device 1200 further includes network interface(s) 1240 for communications between computing device 1200 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality of the cloud services (cloud service A 110, cloud service B 120, cloud service C 130) in cloud environment or infrastructure computing environment 100 shown in FIG. 1.

What is claimed is:

1. A method for allowing multiple infrastructural services to access multiple IoT (Internet of Things) devices, the method comprising:

receiving, by a gateway device, a use request from a first application of a first infrastructural service, wherein the gateway device connects the multiple infrastructural services and the multiple IoT devices;

identifying among the multiple IoT devices, by the gateway device, an IoT device that meets one or more requirements in the use request;

determining, by the gateway device, whether the IoT device is being used by a second application of a second infrastructural service;

assigning, by the gateway device, to the first application an exclusive right to use the IoT device, in response to determining that the IoT device is not being used by the second application;

in response to determining that the IoT device is being used by the second application, determining, by the gateway device, whether a mode of the exclusive right to use and a first-come-first-serve basis or a mode of the exclusive right to use and a priority right basis is configured;

in response to determining that the mode of the exclusive right to use and the first-come-first-serve basis is configured, assigning, by the gateway device, the first application the exclusive right to use an unused IoT device and keeping the exclusive right of the second application to use the IoT device;

in response to determining that the mode of the exclusive right to use and the priority right basis is configured, determining, by the gateway device, whether the first application has a higher priority to use the IoT device than the second application;

in response to determining that the first application has the higher priority than the second application, assigning, by the gateway device, the first application the exclusive right to use the IoT device and depriving the exclusive right of the second application to use the IoT device; and wherein, with the exclusive right, the first application is allowed to solely use the IoT device without being affected by the second application, wherein the first application has a right to refer to data and a right to execute available commands without restriction.

2. The method of claim 1, further comprising:

in response to determining that the IoT device is being used by the second application, determining, by the gateway device, whether a mode of simple sharing and the first-come-first-serve basis or a mode of the simple sharing and the priority right basis is configured;

in response to determining that the mode of the simple sharing and the first-come-first-serve basis is configured, assigning, by the gateway device, to the first application the exclusive right to use the unused IoT device, keeping the exclusive right of the second application to use the IoT device, and assigning the first application a restrictive right to use the IoT device; and wherein, with the restrictive right, the first application executing ones of the available commands for the IoT device is restricted, and the first application cannot modify configurations of the IoT device.

3. The method of claim 2, further comprising:

in response to determining that the mode of the simple sharing and the priority right basis is configured, determining, by the gateway device, whether the first application has the higher priority to use the IoT device than the second application;

in response to determining that the first application has the higher priority than the second application, assigning, by the gateway device, to the first application the exclusive right to use the IoT device, depriving the exclusive right of the second application to use the IoT device, and assigning the second application the restrictive right to use the IoT device; and wherein, with the restrictive right, the second application executing ones of the available commands for the IoT device is restricted, and the second application cannot modify configurations of the IoT device.

4. The method of claim 1, further comprising:

in response to determining that the IoT device is being used by the second application, determining, by the gateway device, whether a mode of time sharing is configured;

in response to determining that the mode of the time sharing is configured, assigning, by the gateway device, to the first application and to the second application the exclusive right in a time sharing manner, in response to determining that the IoT device is being used by the second application; and wherein the gateway device assigns the exclusive right alternatively to the first application and to the second application, according to predetermined respective durations of use allowed for the first application and the second application.

5. The method of claim 1, wherein the use request includes at least one of (1) a type of the IoT device, (2) a location of the IoT device, and (3) an interval of data transfer from the IoT device.

6. A computer program product for allowing multiple infrastructural services to access multiple IoT (Internet of Things) devices, the computer program product comprising one or more computer-readable tangible storage devices and program instructions stored on at least one of the one or more computer-readable tangible storage devices, the program instructions executable to:

receive, by a gateway device, a use request from a first application of a first infrastructural service, wherein the gateway device connects the multiple infrastructural services and the multiple IoT devices;

identify among the multiple IoT devices, by the gateway device, an IoT device that meets one or more requirements in the use request;

determine, by the gateway device, whether the IoT device is being used by a second application of a second infrastructural service;

assign, by the gateway device, to the first application an exclusive right to use the IoT device, in response to determining that the IoT device is not being used by the second application;

in response to determining that the IoT device is being used by the second application, determine, by the gateway device, whether a mode of the exclusive right to use and a first-come-first-serve basis or a mode of the exclusive right to use and a priority right basis is configured;

in response to determining that the mode of the exclusive right to use and the first-come-first-serve basis is configured, assign, by the gateway device, the first application the exclusive right to use an unused IoT device and keep the exclusive right of the second application to use the IoT device;

in response to determining that the mode of the exclusive right to use and the priority right basis is configured, determine, by the gateway device, whether the first application has a higher priority to use the IoT device than the second application;

in response to determining that the first application has the higher priority than the second application, assign by the gateway device, the first application the exclusive right to use the IoT device and deprive the exclusive right of the second application to use the IoT device; and wherein, with the exclusive right, the first application is allowed to solely use the IoT device without being affected by the second application, wherein the first application has a right to refer to data and a right to execute available commands without restriction.

7. The computer program product of claim 6, further comprising the program instructions executable to:

in response to determining that the IoT device is being used by the second application, determine, by the gateway device, whether a mode of simple sharing and the first-come-first-serve basis or a mode of the simple sharing and the priority right basis is configured;

in response to determining that the mode of the simple sharing and the first-come-first-serve basis is configured, assign, by the gateway device, to the first application the exclusive right to use the unused IoT device, keep the exclusive right of the second application to use the IoT device, and assign the first application a restrictive right to use the IoT device; and wherein, with the restrictive right, the first application executing ones of the available commands for the IoT device is restricted, and the first application cannot modify configurations of the IoT device.

8. The computer program product of claim 7, further comprising the program instructions executable to:

in response to determining that the mode of the simple sharing and the priority right basis is configured, determine, by the gateway device, whether the first application has the higher priority to use the IoT device than the second application;

in response to determining that the first application has the higher priority than the second application, assign, by the gateway device, to the first application the exclusive right to use the IoT device, deprive the exclusive right of the second application to use the IoT device, and assign the second application the restrictive right to use the IoT device; and wherein, with the restrictive right, the second application executing ones of the available commands for the IoT device is restricted, and the second application cannot modify configurations of the IoT device.

9. The computer program product of claim 6, further comprising the program instructions executable to:

in response to determining that the IoT device is being used by the second application, determine, by the gateway device, whether a mode of time sharing is configured;

in response to determining that the mode of the time sharing is configured, assign, by the gateway device, to the first application and to the second application the exclusive right in a time sharing manner, in response to determining that the IoT device is being used by the second application; and wherein the gateway device assigns the exclusive right alternatively to the first application and to the second application, according to predetermined respective durations of use allowed for the first application and the second application.

10. The computer program product of claim 6, wherein the use request includes at least one of (1) a type of the IoT device, (2) a location of the IoT device, and (3) an interval of data transfer from the IoT device.

11. A computer system for allowing multiple infrastructural services to access multiple IoT (Internet of Things) devices, the computer system comprising:

one or more processors, one or more computer readable tangible storage devices, and program instructions stored on at least one of the one or more computer readable tangible storage devices for execution by at least one of the one or more processors, the program instructions executable to:

receive, by a gateway device, a use request from a first application of a first infrastructural service, wherein the gateway device connects the multiple infrastructural services and the multiple IoT devices;

identify among the multiple IoT devices, by the gateway device, an IoT device that meets one or more requirements in the use request;

determine, by the gateway device, whether the IoT device is being used by a second application of a second infrastructural service;

assign, by the gateway device, to the first application an exclusive right to use the IoT device, in response to determining that the IoT device is not being used by the second application;

in response to determining that the IoT device is being used by the second application, determine, by the gateway device, whether a mode of the exclusive right to use and a first-come-first-serve basis or a mode of the exclusive right to use and a priority right basis is configured;

in response to determining that the mode of the exclusive right to use and the first-come-first-serve basis is configured, assign, by the gateway device, the first application the exclusive right to use an unused IoT device and keep the exclusive right of the second application to use the IoT device;

in response to determining that the mode of the exclusive right to use and the priority right basis is configured, determine, by the gateway device, whether the first application has a higher priority to use the IoT device than the second application;

in response to determining that the first application has the higher priority than the second application, assign by the gateway device, the first application the exclusive right to use the IoT device and deprive the exclusive right of the second application to use the IoT device; and wherein, with the exclusive right, the first application is allowed to solely use the IoT device without being affected by the second application, wherein the first application has a right to refer to data and a right to execute available commands without restriction.

12. The computer system of claim 11, further comprising the program instructions executable to:

in response to determining that the IoT device is being used by the second application, determine, by the gateway device, whether a mode of simple sharing and the first-come-first-serve basis or a mode of the simple sharing and the priority right basis is configured;

in response to determining that the mode of the simple sharing and the first-come-first-serve basis is configured, assign, by the gateway device, to the first application the exclusive right to use the unused IoT device, keep the exclusive right of the second application to use the IoT device, and assign the first application a restrictive right to use the IoT device; and wherein, with the restrictive right, the first application executing ones of the available commands for the IoT device is restricted, and the first application cannot modify configurations of the IoT device.

13. The computer system of claim 12, further comprising the program instructions executable to:

in response to determining that the mode of the simple sharing and the priority right basis is configured, determine, by the gateway device, whether the first application has the higher priority to use the IoT device than the second application;

in response to determining that the first application has the higher priority than the second application, assign, by the gateway device, to the first application the exclusive right to use the IoT device, deprive the exclusive right of the second application to use the IoT device, and assign the second application the restrictive right to use the IoT device; and wherein, with the restrictive right, the second application executing ones of the available commands for the IoT device is restricted, and the second application cannot modify configurations of the IoT device.

14. The computer system of claim 11, further comprising the program instructions executable to:

in response to determining that the IoT device is being used by the second application, determine, by the gateway device, whether a mode of time sharing is configured;

in response to determining that the mode of the time sharing is configured, assign, by the gateway device, to the first application and to the second application the exclusive right in a time sharing manner, in response to determining that the IoT device is being used by the second application; and wherein the gateway device assigns the exclusive right alternatively to the first application and to the second application, according to predetermined respective durations of use allowed for the first application and the second application.

15. The computer system of claim 11, wherein the use request includes at least one of (1) a type of the IoT device, (2) a location of the IoT device, and (3) an interval of data transfer from the IoT device.

* * * * *